United States Patent
Doerr et al.

(10) Patent No.: US 9,424,441 B2
(45) Date of Patent: *Aug. 23, 2016

(54) MULTIPROCESSOR FABRIC HAVING CONFIGURABLE COMMUNICATION THAT IS SELECTIVELY DISABLED FOR SECURE PROCESSING

(71) Applicant: COHERENT LOGIX, INCORPORATED, Austin, TX (US)

(72) Inventors: Michael B. Doerr, Dripping Springs, TX (US); Carl S. Dobbs, Austin, TX (US); Michael B. Solka, Austin, TX (US); Michael R. Trocino, Austin, TX (US); David A. Gibson, Austin, TX (US)

(73) Assignee: Coherent Logix, Incorporated, Austin, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/504,960

(22) Filed: Oct. 2, 2014

(65) Prior Publication Data

US 2015/0026451 A1 Jan. 22, 2015

Related U.S. Application Data

(63) Continuation of application No. 13/274,138, filed on Oct. 14, 2011, now Pat. No. 8,880,866.

(60) Provisional application No. 61/393,594, filed on Oct. 15, 2010.

(51) Int. Cl.
*G06F 1/24* (2006.01)
*G06F 9/00* (2006.01)
(Continued)

(52) U.S. Cl.
CPC .............. *G06F 21/71* (2013.01); *G06F 15/163* (2013.01); *G06F 15/167* (2013.01);
(Continued)

(58) Field of Classification Search
CPC ... G06F 13/4221; G06F 3/0635; G06F 13/00; G06F 9/3897
See application file for complete search history.

(56) References Cited

U.S. PATENT DOCUMENTS

| 4,493,048 A | 1/1985 | Kung et al. |
| 4,720,780 A | 1/1988 | Dolecek |

(Continued)

FOREIGN PATENT DOCUMENTS

| EP | 0 266 300 A2 | 5/1988 |
| GB | 2 276 742 | 10/1994 |
| WO | 0163647 | 8/2001 |

OTHER PUBLICATIONS

Agarwal, "Raw Computation," Scientific American, Aug. 1999,5 pages.

(Continued)

*Primary Examiner* — Xuxing Chen
(74) *Attorney, Agent, or Firm* — Meyertons Hood Kivlin Kowert & Goetzel, P.C.; Jeffrey C. Hood

(57) ABSTRACT

Disabling communication in a multiprocessor fabric. The multiprocessor fabric may include a plurality of processors and a plurality of communication elements and each of the plurality of communication elements may include a memory. A configuration may be received for the multiprocessor fabric, which specifies disabling of communication paths between one or more of: one or more processors and one or more communication elements; one or more processors and one or more other processors; or one or more communication elements and one or more other communication elements. Accordingly, the multiprocessor fabric may be automatically configured in hardware to disable the communication paths specified by the configuration. The multiprocessor fabric may be operated to execute a software application according to the configuration.

20 Claims, 17 Drawing Sheets

(51) Int. Cl.

| | |
|---|---|
| *G06F 21/71* | (2013.01) |
| *G06F 15/163* | (2006.01) |
| *G06F 15/76* | (2006.01) |
| *G06F 15/167* | (2006.01) |
| *G06F 15/173* | (2006.01) |
| G06F 3/06 | (2006.01) |
| G06F 13/00 | (2006.01) |
| G06F 13/42 | (2006.01) |

(52) U.S. Cl.
CPC ......... *G06F 15/17343* (2013.01); *G06F 15/76* (2013.01); *G06F 3/0635* (2013.01); *G06F 13/00* (2013.01); *G06F 13/4221* (2013.01)

(56) References Cited

U.S. PATENT DOCUMENTS

| | | | |
|---|---|---|---|
| 4,739,476 A | 4/1988 | Fiduccia | |
| 4,807,183 A | 2/1989 | Kung et al. | |
| 4,873,630 A | 10/1989 | Rusterholz et al. | |
| 4,922,418 A | 5/1990 | Dolecek | |
| 4,933,836 A | 6/1990 | Tulpule et al. | |
| 4,945,479 A | 7/1990 | Rusterholz et al. | |
| 5,602,999 A | 2/1997 | Hyatt | |
| 5,630,162 A | 5/1997 | Wilkinson et al. | |
| 5,634,043 A | 5/1997 | Self et al. | |
| 5,689,719 A | 11/1997 | Miura et al. | |
| 5,805,915 A | 9/1998 | Wilkinson et al. | |
| 5,903,466 A | 5/1999 | Beausang et al. | |
| 5,944,779 A | 8/1999 | Blum | |
| 5,963,746 A | 10/1999 | Barker et al. | |
| 6,106,575 A | 8/2000 | Hardwick | |
| 6,145,117 A | 11/2000 | Eng | |
| 6,226,776 B1 | 5/2001 | Panchul et al. | |
| 6,253,371 B1 | 6/2001 | Iwasawa | |
| 6,421,772 B1 | 7/2002 | Maeda et al. | |
| 6,433,802 B1 | 8/2002 | Ladd | |
| 6,466,898 B1 | 10/2002 | Chan | |
| 6,708,325 B2 | 3/2004 | Cooke | |
| 6,766,437 B1 | 7/2004 | Coscarella et al. | |
| 6,968,447 B1 | 11/2005 | Apisdorf et al. | |
| 6,981,232 B1 | 12/2005 | Lien et al. | |
| 6,990,641 B2 | 1/2006 | Tamai | |
| 7,000,092 B2 | 2/2006 | Gehman | |
| 7,130,457 B2 | 10/2006 | Kaufman | |
| 7,333,540 B2 | 2/2008 | Yee | |
| 7,356,670 B2 | 4/2008 | Van Eijndhoven et al. | |
| 7,415,594 B2 | 8/2008 | Doerr et al. | |
| 7,437,500 B2 | 10/2008 | Butt et al. | |
| 7,441,066 B2 | 10/2008 | Bouchier et al. | |
| 7,542,981 B2 | 6/2009 | Choy et al. | |
| 7,555,566 B2 | 6/2009 | Blumrich et al. | |
| 7,761,817 B2 | 7/2010 | Eng | |
| 7,774,580 B2 | 8/2010 | Saito et al. | |
| 7,853,937 B2 | 12/2010 | Janczewski | |
| 8,099,583 B2* | 1/2012 | Wang | 712/219 |
| 8,225,073 B2 | 7/2012 | Master et al. | |
| 8,230,408 B2 | 7/2012 | Eng | |
| 8,301,866 B2 | 10/2012 | Kurosawa | |
| 2001/0042138 A1 | 11/2001 | Buendgen | |
| 2002/0138244 A1 | 9/2002 | Meyer | |
| 2003/0149859 A1 | 8/2003 | Hyduke | |
| 2003/0191869 A1 | 10/2003 | Williams et al. | |
| 2004/0030859 A1 | 2/2004 | Doerr et al. | |
| 2004/0103265 A1 | 5/2004 | Smith | |
| 2004/0117519 A1 | 6/2004 | Smith | |
| 2004/0194038 A1 | 9/2004 | Tamai | |
| 2004/0264309 A1* | 12/2004 | Stolowitz | 369/36.01 |
| 2005/0128966 A1 | 6/2005 | Yee | |
| 2006/0101314 A1 | 5/2006 | Husbands et al. | |
| 2006/0242385 A1* | 10/2006 | Murakami | G06F 9/30145 712/200 |
| 2007/0226686 A1 | 9/2007 | Beardslee et al. | |
| 2007/0239966 A1 | 10/2007 | Georgiou | |
| 2007/0266119 A1 | 11/2007 | Ohly | |
| 2009/0243650 A1* | 10/2009 | Madurawe | H03K 19/17796 326/38 |
| 2010/0322358 A1 | 12/2010 | Drumm et al. | |
| 2011/0113219 A1* | 5/2011 | Golshan | G06F 9/44505 712/30 |
| 2011/0154345 A1* | 6/2011 | Kruglick | 718/103 |

OTHER PUBLICATIONS

Waingold et al., "Baring It All to Software: Raw Machines," IEEE Computer, Sep. 1997, 8 pages.

Taylor et al., "The Raw Microprocessor: A Computational Fabric for Software Circuits and General-Purpose Programs," IEEE Micro, Mar.-Apr. 2002, 11 pages.

Lee et al., "Space-Time Scheduling of Instruction-Level Parallelism on a Raw Machine," Proceedings of the Eighth International Conference on Architectural Support for Programming Language and Operating Systems (ASPLOS-8), Oct. 1998, 11 pages.

Barua et al., "Compiler Support for Scalable and Efficient Memory Systems," IEEE Transactions on Computers, Nov. 2001, 32 pages.

Lee et al., "Convergent Scheduling," Proceedings of the 35th International Symposium on Microarchitecture (MICRO-35), Nov. 2002, 12 pages.

Babb et al., "Parallelizing Applications into Silicon," Proceedings of the IEEE Workshop on FPGAs for Custom Computing Machines '99 (FCCM '99), Apr. 1999, 11 pages.

Babb et al., "The RAW Benchmark Suite: Computation Structures for General Purpose Computing," IEEE Symposium on Field-Programmable Custom Computing Machines (FCCM '97), Apr. 1997, 10 pages.

Babb et al., "Solving Graph Problems with Dynamic Computation Structures," SPIE Photonics East: Reconfigurable Technology for Rapid Product Development & Computing, Nov. 1996, 12 pages.

Frank et al., "SUDS: Primitive Mechanisms for Memory Dependence Speculation," MIT/LCS Technical Memo LCSTM-591, Jan. 6, 1999, 9 pages.

Barua, "Maps: A Compiler-Managed Memory System for Software-Exposed Architectures," PhD Thesis, MIT Laboratory for Computer Science, Jan. 2000, 161 pages.

Barua et al., "Maps: A Compiler-Managed Memory System for Raw Machines," Proceedings of the Twenty-Sixth International Symposium on Computer Architecture (ISCA-26), Jun. 1999, 12 pages.

Barua et al., "Memory Bank Disambiguation using Modulo Unrolling for Raw Machines," Proceedings of the Fifth International Conference on High Performance Computing, Dec. 1998,9 pages.

Moritz, et al., "Hot Pages: Software Caching for Raw Microprocessors," MIT/LCS Technical Memo LCS-TM-599, Aug. 1999, 12 pages.

Miller, "Software Based Instruction Caching for the RAW Architecture," Master's Thesis, Massachusetts Institute of Technology, May 1999,39 pages.

Taylor et al., "How to build scalable on-chip ILP networks for a decentralized architecture," MIT/LCS Technical Memo MIT-LCS-TM-628, Apr. 2000, 15 pages.

Taylor et al., "Scalar Operand Networks: On-chip Interconnect for ILP in Partitioned Architectures," MIT/LCS Technical Report LCS-TR-859, Jul. 2002, 20 pages.

Taylor, "Design Decisions in the Implementation of a Raw Architecture Workstation," Master's Thesis, Massachusetts Institute of Technology, Sep. 1999,90 pages.

Moritz et al., "Exploring Optimal Cost-Performance Designs for Raw Microprocessors," Proceedings of the International IEEE Symposium on Field-Programmable Custom Computing Machines (FCCM 98), Apr. 1998, 16 pages.

Agarwal et al., "The Raw Compiler Project," Proceedings of the Second SUIF Compiler Workshop, Stanford, CA, 1997, 12 pages.

Parker, "A component-based architecture for parallel multi-physics POE simulation," Future Generations Computer Systems, Elsevier Science Publishers, vol. 22, No. 1-2,2006, pp. 204-216.

Agarwal, Anant, et al., "The MIT Alewife Machine", Proceedings of the IEEE, vol. 87, No. 3, Mar. 1999, pp. 430-444.

(56) References Cited

OTHER PUBLICATIONS

Houzet, D. et al., "A shared memory model on a cluster of PCs", Microprocessors and Microsystems, IPC Business Press Ltd. London, vol. 23, No. 3, Oct. 1, 1999, pp. 125-134.

Kimelman, D. et al., "Visualizing the Execution of High Performance Fortran (HPF) Programs", Proceedings of the 9th International Parallel Processing Symposium, Santa Barbara, CA, Apr. 25-28, 1995, IEEE Computer Society, Los Alamitos, CA, Apr. 25, 1995, pp. 750-759.

Burns, "An Architecture for Verilog Hardware Accelerator," Verilog HDL Conference, IEEE, Feb. 26, 1996, pp. 2-11, XP010159444.

Radhakrishnan, et al., "External Adjustment of Runtime Parameters in Time Warp Synchronized Parallel Simulators," Parallel Processing Symposium, Apr. 1, 1997, pp. 260-266, XPOI0216791.

Sun, Fe I, et al, "Synthesis of custom processors based on extensible platforms," IEEE/ACM International Conference on Computer Aided Design 2002, IEEE/ACM Digest of Technical Papers, San Jose, CA, Nov. 10-14, 2002, New York, NY: IEEE Nov. 10, 2002, pp. 641-648.

Gonzalez, "Xtensa: A Configurable and Extensible Processor", IEEE Micro, IEEE Service Center, Los Alamitos, CA, US, vol. 20, No. 2, Mar. 2000, pp. 60-70.

Hutton, et al., "A Methodology for FPGA to Structured-ASIC Synthesis and Verification," Design, Automation, and Test in Europe, 2006, Proceedings Munich, Germany, Mar. 6-10, 2006, Piscataway, New Jersey, Mar. 6, 2006, pp. 1-6.

Singh, et al, "SoC Synthesis with automatic hardware software interface generation", VLSI Design, 2003, Proceedings, 16th International Conference, Jan. 4-8, 2003, Piscataway, New Jersey, Jan. 4, 2003, pp. 585-590.

Jens Spars, Henrik N. Jorgensen, Erik Pmske, Steen Pedersen, and Thomas Rubner-Petersen; "An Area-Efficient Topology for VLSI Implementation of Viterbi Decoders and Other Shuffle-Exchange Type Structures"; IEEE Journal of Solid-State Circuits, vol. 26, No. 2; Feb. 1991; 8 pages.

Ralf Koetier, Andrew C. Singer, Michael Tuchler; "Turbo Equalization"; IEEE Signal Processing Magazine, Jan. 2004; pp. 67-80.

Michael Tuchler, Ralf Koetter, Andrew C. Singer; "Turbo Equalization: Principles and New Results"; IEEE Transactions on Communications; May 2002; pp. 754-767.

S. Benedetto, D. Divsalar, G. Montorsi, F. Pollara; "Soft-Output Decoding Algorithms in Iterative Decoding of Turbo Codes"; TDA Progress Report 42-124; Feb. 1996; pp. 63-87.

Simon Huettinger, Marco Breiling, Johannes Huber; "Memory Efficient Implementation of the BCJR Algorithm"; 2nd International Symposium on Turbo Codes & Related Topics—Brest, France; 2000; pp. 479-482.

International Search Report and Written Opinion in Application No. PCT/US2011/056438 dated Feb. 15, 2012, 9 pages.

\* cited by examiner 82
computer system

| # | security module specification | addressed by developer through |
|---|---|---|
| 1 | module definition | software |
| 2 | secure/cryptographic boundary | software (hardware properties) & custom boot |
| 3 | approved algorithms | software |
| 4 | approved modes of operation | software |
| 5 | critical security IO/data ports logically or physically seperated | software and boundary (#2) |
| 6 | identity-based roles, services, & authentication | software |
| 7 | finite state model definition | software |
| 8 | key management | |
| 8.1 | random number and key generation | software |
| 8.2 | key establishment | software |
| 8.3 | key distribution and entry/output | software and boundary (#2) |
| 8.4 | secure key storage | software and boundary (#2), & custom boot |
| 8.5 | yey zeroization | software |
| 9 | power-up tests -- algorithmic, integrity, critical functions | software |
| 10 | condition tests | software |
| 11 | design assurance through formal model | design & development process |

FIG. 13

MULTIPROCESSOR FABRIC HAVING CONFIGURABLE COMMUNICATION THAT IS SELECTIVELY DISABLED FOR SECURE PROCESSING

PRIORITY INFORMATION

This application is a continuation of U.S. patent application Ser. No. 13/274,138 titled "Method and System for Disabling Communication Paths in a Multiprocessor Fabric by Setting Register Values to Disable the Communication Paths Specified by a Configuration" and filed on Oct. 14, 2011, whose inventors were Michael B. Doerr, Carl S. Dobbs, Michael B. Solka, Michael R Trocino, and David A. Gibson, which claims benefit of priority of U.S. Provisional Application Ser. No. 61/393,594 titled "Software Defined Secure System" filed Oct. 15, 2010, whose inventors were Michael B. Doerr, Carl S. Dobbs, Michael B. Solka, Michael R. Trocino, and David A. Gibson, which is hereby incorporated by reference in its entirety as though fully and completely set forth herein.

FIELD OF THE INVENTION

The field of the invention generally relates to computer system security, and more particularly to a software defined secure system.

DESCRIPTION OF THE RELATED ART

One of the basic human needs is security, the need to feel assured. Unfortunately, through the ages there have been entities in the world who want to do harm, for example, steal or damage property, interrupt or damage organizations or governments, etc. Their motivations have varied from seeking personal gain to political reasons. As society has entered the digital age and the boundaries between communication and information have been further obfuscated, security and the methods to arrive at quantifiable assurance levels are becoming critical to sustain the current level of life.

A driving force behind commercial information security requirements is the appetite for communication and connection to the digital world at any time or place. This environment, which has been evolving towards ubiquitous communication and computing solutions, has been driven early on by the telecommunications sector. This sector breaks down into the consumer, industrial, medical, public safety, government and military segments. The military has traditionally led this area technically. However, as industries have accepted and evolved their operational practices through the realization of this new capability, the consumer, industrial/enterprise, and medical markets now face similar challenges. Accordingly, improvements in security are desired.

SUMMARY OF THE INVENTION

Various embodiments for securing a system with a multiprocessor fabric are provided below. The multiprocessor fabric may include a plurality of processors and a plurality of communication elements. Each communication elements may be dynamically configurable and/or may include a plurality of communication ports, a memory, and/or a routing engine, among other possible elements. Each processor may include at least one arithmetic logic unit, an instruction processing unit, and/or a plurality of processor ports, among other possible elements. The communication elements and processors may be coupled together in an interspersed manner. For example, for each of the processors, a plurality of processor ports may be configured for coupling to a first subset of the plurality of communication elements, and for each of the communication elements, a first subset of communication ports may be configured for coupling to a subset of the plurality of processors and a second subset of communication ports may be configured for coupling to a second subset of the plurality of communication elements.

In one embodiment, a configuration for the multiprocessor fabric may be received, e.g., automatically, during a boot process of the multiprocessor fabric or a system including the multiprocessor fabric. The configuration may specify disabling of communication paths between one or more of the processor and/or communication elements. For example, the configuration may specify disabling of communication paths between one or more processors and one or more communication elements, one or more processors and one or more other processors, and/or one or more communication elements and one or more other communication elements.

As a few examples, the configuration may specify disabling of communication between a first portion of the multiprocessor fabric and a second portion of the multiprocessor fabric, e.g., to isolate the first portion from the second portion during operation. As another example, the configuration may specify disabling of memory access of a first portion of the multiprocessor fabric by a second portion of the multiprocessor fabric, e.g., so that the second portion is unable to access memories comprised in the first portion during operation.

In response, the multiprocessor fabric may be automatically configured in hardware to disable the communication paths specified by the configuration. Accordingly, the multiprocessor fabric may be operated to execute a software application according to the configuration.

In one embodiment, the configuring may include setting register values corresponding to one or more processors and/or one or more communication elements to disable the communication paths specified by the configuration. In one embodiment, after the configuring, the disabled communication paths may not be restorable via software.

Alternatively, or additionally, the configuration discussed above may be loaded based on software or code loaded into the multiprocessor fabric. For example, authenticated code may be initially loaded which includes the configuration. In one embodiment, the authenticated code may include a plurality of configurations or modifications to the configurations which may be used throughout operation. For example, a second configuration may be received from the authenticated code and the automatic configuration discussed above may be performed for the second configuration.

BRIEF DESCRIPTION OF THE DRAWINGS

A better understanding of the present invention can be obtained when the following detailed description of the preferred embodiment is considered in conjunction with the following drawings, in which:

FIGS. 9-16 correspond to specific embodiments for securing a multiprocessor system.

Figure 1:
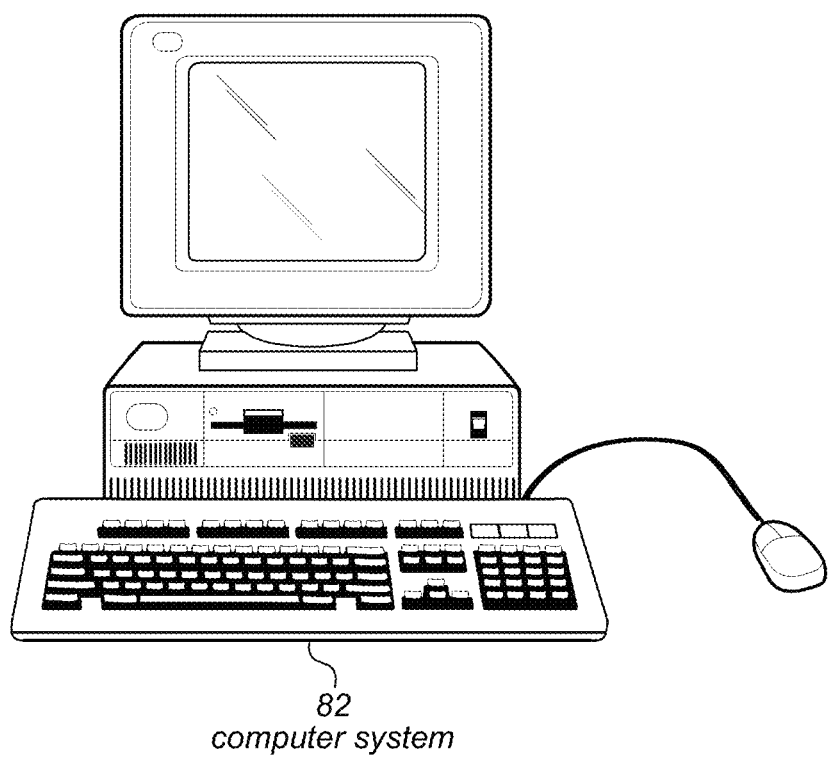
FIG. 1 illustrates an exemplary computer system which may utilize embodiments of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Incorporation by Reference

The following patent is hereby incorporated by reference in its entirety as though fully and completely set forth herein:

U.S. Pat. No. 7,415,594 titled "Processing System with Interspersed Stall Propagating Processors and Communication Elements filed on Jun. 24, 2003, whose inventors are Michael B. Doerr, William H. Hallidy, David A. Gibson, and Craig M. Chase.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical or optical signals.

Programmable Hardware Element—includes various hardware devices comprising multiple programmable function blocks connected via a programmable or hardwired interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Application Specific Integrated Circuit (ASIC)—this term is intended to have the full breadth of its ordinary meaning. The term ASIC is intended to include an integrated circuit customized for a particular application, rather than a general purpose programmable device, although ASIC may contain programmable processor cores as building blocks. Cell phone cell, MP3 player chip, and many other single-function ICs are examples of ASICs. An ASIC is usually described in a hardware description language such as Verilog or VHDL.

Program—the term "program" is intended to have the full breadth of its ordinary meaning. The term "program" includes 1) a software program which may be stored in a memory and is executable by a processor or 2) a hardware configuration program useable for configuring a programmable hardware element or ASIC.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element or ASIC.

Computer System—any of various types of computing or processing systems, including a personal computer system (PC), mainframe computer system, workstation, network appliance, Internet appliance, personal digital assistant (PDA), grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

System Security

There is no single feature or function that provides information security. Security is a property of a system, the combination of users, protocols, software, and hardware. The overall goal of information security is to process and communicate information between authorized users and to prevent unauthorized access of that information.

Information security goals can be broken down and met by addressing the following security objectives:

1. Availability (of systems and data for intended use only). Availability is a requirement intended to assure that systems work promptly and service is not denied to authorized users. This objective protects against: Intentional or accidental attempts to either: perform unauthorized deletion of data or otherwise cause a denial of service or data; and Attempts to use system or data for unauthorized purposes. Availability is frequently an organization's foremost security objective.

2. Integrity (of system and data). Integrity has two facets: data integrity (the property that data has not been altered in an unauthorized manner while in storage, during processing, or while in transit) or System integrity (the quality that a system has when performing the intended function in an unimpaired manner, free from unauthorized manipulation). Integrity is commonly an organization's most important security objective after availability.

3. Confidentiality (of data and system information). Confidentiality is the requirement that private or confidential information will not be disclosed to unauthorized individuals. Confidentiality protection applies to data in storage, during processing, and while in transit. For many organizations, confidentiality is frequently behind availability and integrity in terms of importance. Yet for some systems and for specific types of data in most systems (e.g., authenticators), confidentiality is extremely important.

4. Accountability (to the individual level). Accountability is the requirement that actions of an entity may be traced uniquely to that entity. Accountability is often an organizational policy requirement and directly supports non-repudiation, deterrence, fault isolation, intrusion detection and prevention, and after-action recovery and legal action.

5. Assurance (that the other four objectives have been adequately met). Assurance is the basis for confidence that the security measures, both technical and operational, work as intended to protect the system and the information it processes. The other four security objectives (integrity, availability, confidentiality, and accountability) have been adequately met by a specific implementation when: required functionality is present and correctly implemented, there is sufficient protection against unintentional errors (by users or software), and there is sufficient resistance to intentional penetration or by-pass. Assurance may be essential, where, without it, the other objectives are not met. However, assurance is a continuum; the amount of assurance needed varies between systems.

Embodiments described herein relate to an information security development framework, supporting a systems development methodology and which can meet some or all of the objectives discussed above. Embodiments described herein include development processes for creating a secure system. Embodiments also include an associated software and hardware development tool suite which may guide an architect and/or engineer in the design and development of an information security target assurance level quality. This target assurance level may be achieved by both defining and meeting the functionality requirements in each of the objectives discussed above. The assurance level achieved may allow for a system to not only provide the intended functionality, but also ensure that undesired actions do not occur.

The term "Development Methodology" may refer to a rationale and set of philosophical assumptions which outline a group of rules and postulates that underlie and guide the definition of an information security development process.

The term "Development Process" may refer to the life-cycle for development based on a methodology. At a coarse level it describes how to drive user requirements and constraints through design, implementation, verification, deployment, and maintenance.

As noted above, the Development Tool Suite described herein is a set of one or more software programs which are executable to guide a user or developer through a development process, enforcing a methodology, and which may automate steps and portions of steps wherever possible.

FIG. 1—Exemplary Computer System

FIG. 1 illustrates an exemplary computer system which implements embodiments of the invention. Embodiments of the invention may be used in any of various computer systems, such as standard desktop computing platforms (e.g., PCs or Macs), servers, mobile communication devices, smart phones, etc. The computer system preferably includes a processor based on HyperX™ technology. The HyperX processor is described in U.S. Pat. No. 7,415,594, incorporated by reference above.

Figure 2:
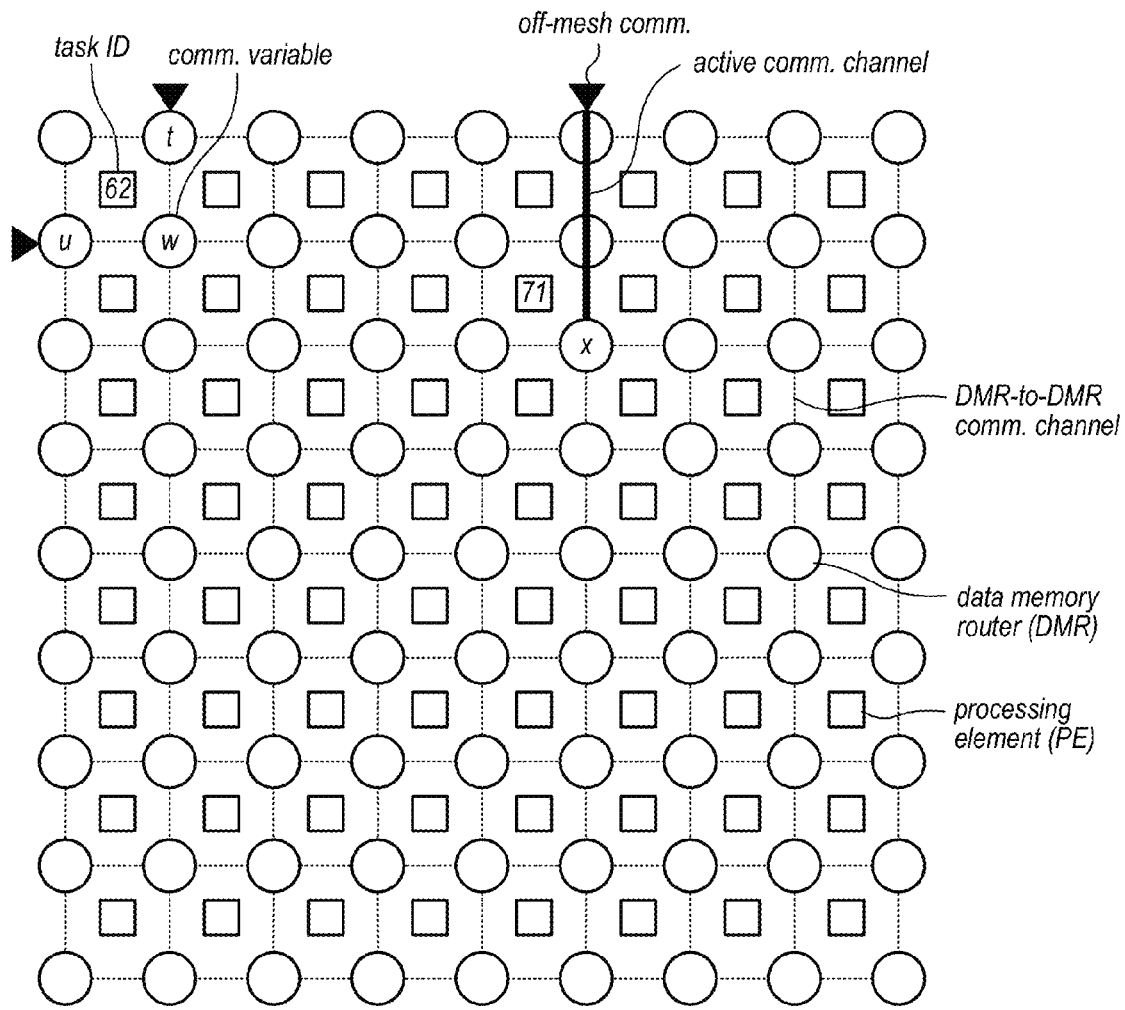
FIGS. 2-6B illustrates exemplary embodiments of a multiprocessor system.
Figure 3:
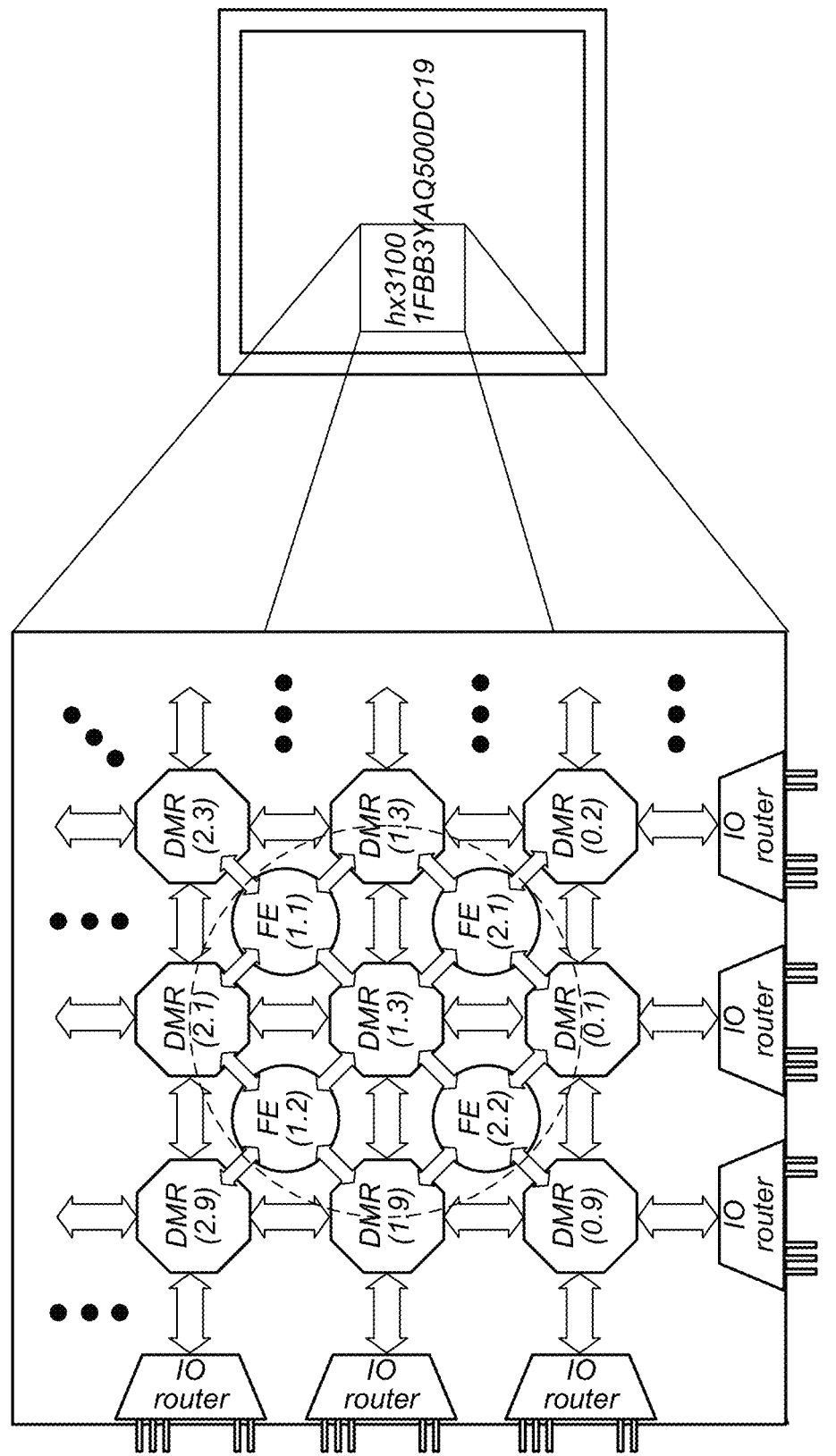
Figure 4:
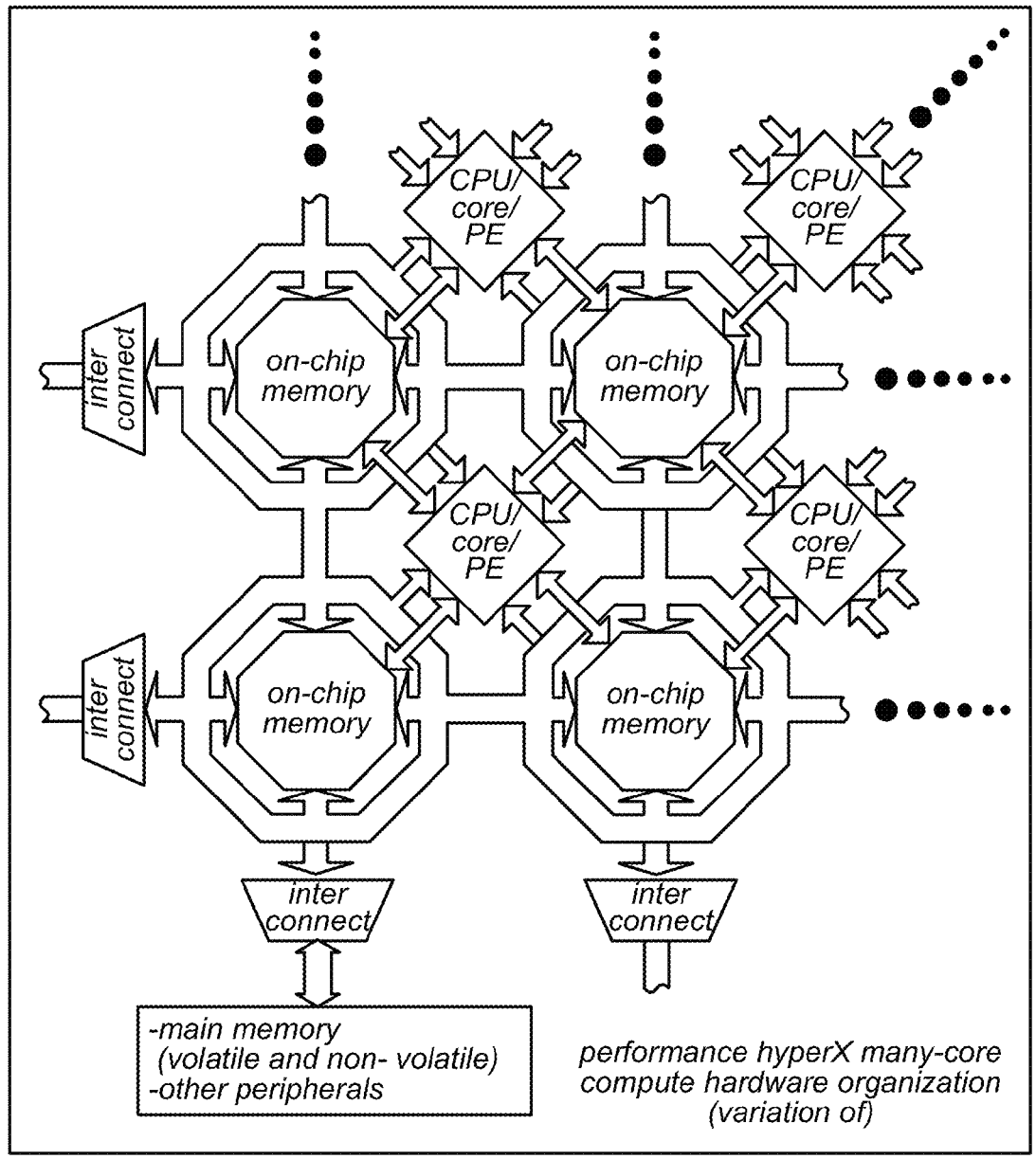
Figure 5:
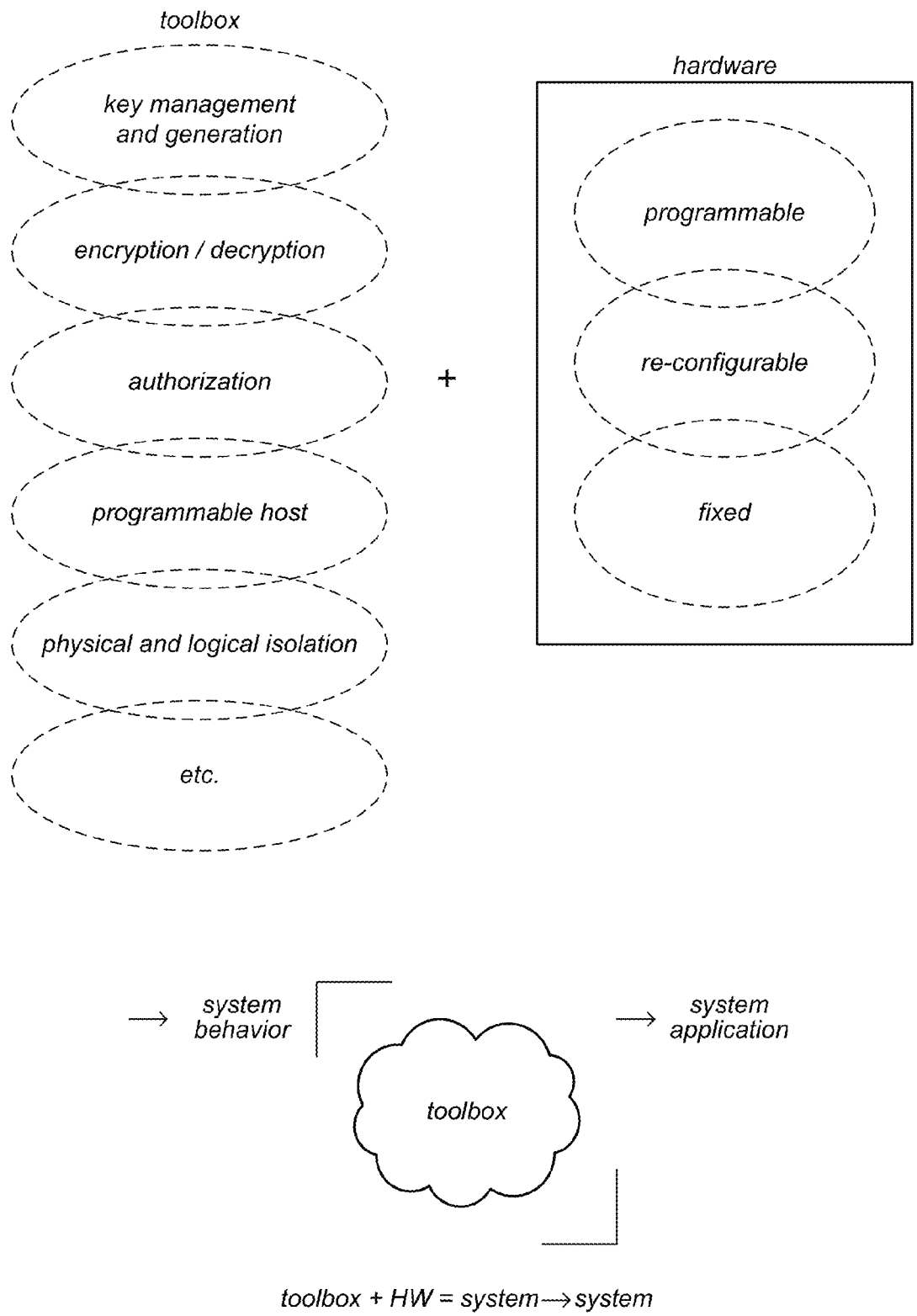

FIGS. 2 and 3—Exemplary Multiprocessor Systems

FIG. 2 illustrates an exemplary embodiment of a multiprocessor system, which may be referred to as the "HyperX architecture". A multi-processor system or fabric is a parallel computational platform comprising multiple processors, memories (unified and/or distributed), and communication (or communication network) resources. An exemplary multi-processor system comprises a plurality of processors, where each of the processors is coupled to at least one other processor, and where there are multiple communication mechanisms between the respective processors. The multi-processor system may include a plurality of memories coupled to the processors. For example, the memories may be interspersed among the processors. More specifically, the multi-processor system may comprise a plurality of communication units interspersed among the processors, wherein each of the communication units comprises a memory and routing logic. As used herein, the term "coupled" means directly or indirectly connected. The multi-processor system may or may not be embodied on a single integrated circuit, a single printed circuit board, or a single system. For example, the multi-processor system may be embodied as a plurality of integrated circuits, a plurality of printed circuit boards, a plurality of systems, or some combination thereof.

An example of such a multi-processor system is the multicore HyperX architecture disclosed in U.S. Pat. No. 7,415,594, referenced above. In one embodiment, the central core building block of the HyperX architecture is a scalable unit-cell-based hardware fabric, referred to as a HyperSlice. The hardware architecture may be formed by replicating this core unit-cell to create a multi-core parallel processing system. Each HyperSlice may include one or more DMRs (Data Memory and Router, also referred to as a "communication element") and Processing Element (PE).

The DMR may provide data memory, control logic, registers, and routers for fast routing services to the processing resources. The hardware fabric is created by joining HyperSlices together, forming the on-chip memory-network. This on-chip memory-network operates independently and transparently to the processing resources. It may provide on-demand bandwidth through a real-time programmable and adaptable communication fabric between HyperSlices supporting arbitrary network topologies of functions or system implementations. Coordinated groups of HyperSlices may be formed and reformed "on-the-fly" under software control. This ability to dynamically alter the amount of hardware used to evaluate a function allows for the optimal application of hardware resources to relieve processing bottlenecks.

The DMR may provide nearest neighbor, regional, and global communication across the chip and from chip to chip. The DMR may perform this through four different transfer modes; memory to memory, memory to register, register to memory, and register to register. Each of the transfer modes may physically use the DMR resources to send data/messages differently depending on locality of data and software algorithm requirements. A "Quick Port" facility may be provided to transfer a word of data from a processor to anywhere rapidly. For block transfers, Direct Memory Access (DMA) engines within the DMR may be available to manage the movement of data across the memory and routing fabric. For nearest neighbor communication, the use of shared memory and registers may be the most efficient method of data movement. For regional and global data movement, using the routing fabric may be the most efficient method. Communication channels can either be dynamic or static. Dynamic routes may be set up for data transfer and torn down upon the completion of the transfer to free up routing resources for other data transfers. Static routes may remain in place throughout the program execution and are primarily used for high priority and critical communications. Data transfers and the choice of communication channel may be under software program control. Multiple communication channels may exist to support simultaneous data transfer between any senders and receivers.

The architecture of the DMR may allow different interchangeable PEs to be used in a multi-processor fabric to optimize the system for specific applications. A HyperX multi-processor system may comprise either a heterogeneous or homogeneous array of PEs. A PE may be a conventional processor, or alternatively a PE may not conform to the conventional definition of a processor. A PE may simply be a collection of logic gates serving as a hard-wired processor for certain logic functions where programmability is traded off for higher performance, smaller area, and/or lower power.

FIG. 2 illustrates a view of the network of processing elements (PE's) and Data Memory Routers (DMRs) of an exemplary HyperX system. The PE's are shown as boxes and the DMRs are shown as circles. The routing channels between DMRs are shown as dotted lines. Solid triangles show off-mesh communication and solid lines show active data communication between DMRs. A computational task is shown by its numerical identifier and is placed on the PE that is executing it. A data variable being used for communication is shown by its name and is placed on the DMR that contains it.

FIG. 3 illustrates an exemplary multiprocessor system comprised on a chip. As shown, the chip may include a plurality of I/O routers on the exterior of the chip as well as an interior multiprocessor fabric, similar to embodiments described above regarding FIG. 2. As shown, the processor architecture may include inherent multi-dimensionality, but physically planarized in its current die realization as shown in FIGS. 2-4A. The processor architecture may have high energy efficient characteristics and may also be fundamentally scalable and reliable—representing both secure and dependable notions. Aspects that enable the processor architecture to achieve unprecedented performance include the streamlined processors, memory-network, and flexible IO. The processing elements (PEs) or Cores may be full-fledged DSP/GPPs and based on a memory to memory (cacheless) architecture sustained by a variable width instruction word instruction set architecture that may dynamically expand the execution pipeline to maintain throughput while simultaneously maximizing use of hardware resources. For example, a single instruction can kick-off more than 40 traditional RISC operations in a single-cycle, according to one embodiment.

FIGS. 4, 5, 6A, and 6B illustrate another view of the HW/SW operating stack of the multiprocessor architecture. The memory-network (DMRs) may provide autonomous and instantaneous bandwidth on demand which in turn may provide the execution model two features. First, the memory-network may enable a mixed memory programming model. Historically, programming models were restricted to a fully distributed or fully shared execution memory model due to hardware and programming model restrictions. This leads to inefficiencies in hardware adaptability and reconfigurability. The mixed-memory model may react in real-time to changing dynamics and requirements of the software running Second, the communication network may be logically topology independent, e.g., adaptable and reconfigurable in real-time. This independence may allow the appropriate hardware topology to be created to support the natural parallelism of the algorithm/system, thus not constraining the algorithm/system to a particular topology. These features may enable realization of the natural efficiencies of any system. Further, the multiprocessor system may be inherently scalable, self synchronized, and may effectively support autonomous memory coherence if required by the system. In one embodiment, this system may be distributed across many die/chips supporting hundreds to thousands of processors in both hardware and software.

In one specific embodiment, the capabilities of the software defined secure system (SDS2), described herein, can be described as follows: There is a toolbox of capabilities (e.g., shown in FIG. 5), for example, key management and generation, encryption/decryption, authentication, programmable boot, physical and logical isolation, etc. Additionally, there is hardware with properties supporting fixed functions, configurability, re-configurability, and programmability. Through a development process, the developer may be able to create or program behavior of a secure system using the toolbox of capabilities in conjunction with the hardware.

The system once programmed, may be configured to reuse the toolbox and hardware from which it was created to behave in a secure manner. Traditionally, a secure system has been created from resources separate from resources executing intended secure behavior and two resulted in the development of a secure system in a piecemeal manner resulting in ineffective solutions. This new capability, based on a holistic approach from a systems view, may enable (1) the creation of a customized secure solution for an infinite variety of systems requiring differentiated types of security, (2) the optimization of behavior and performance of the secure system both statically and dynamically, and (3) system to be designed from the ground-up from defined behavior of hardware and software interaction primitives. This results in the potential ability to develop provably secure systems.

Figure 6A:
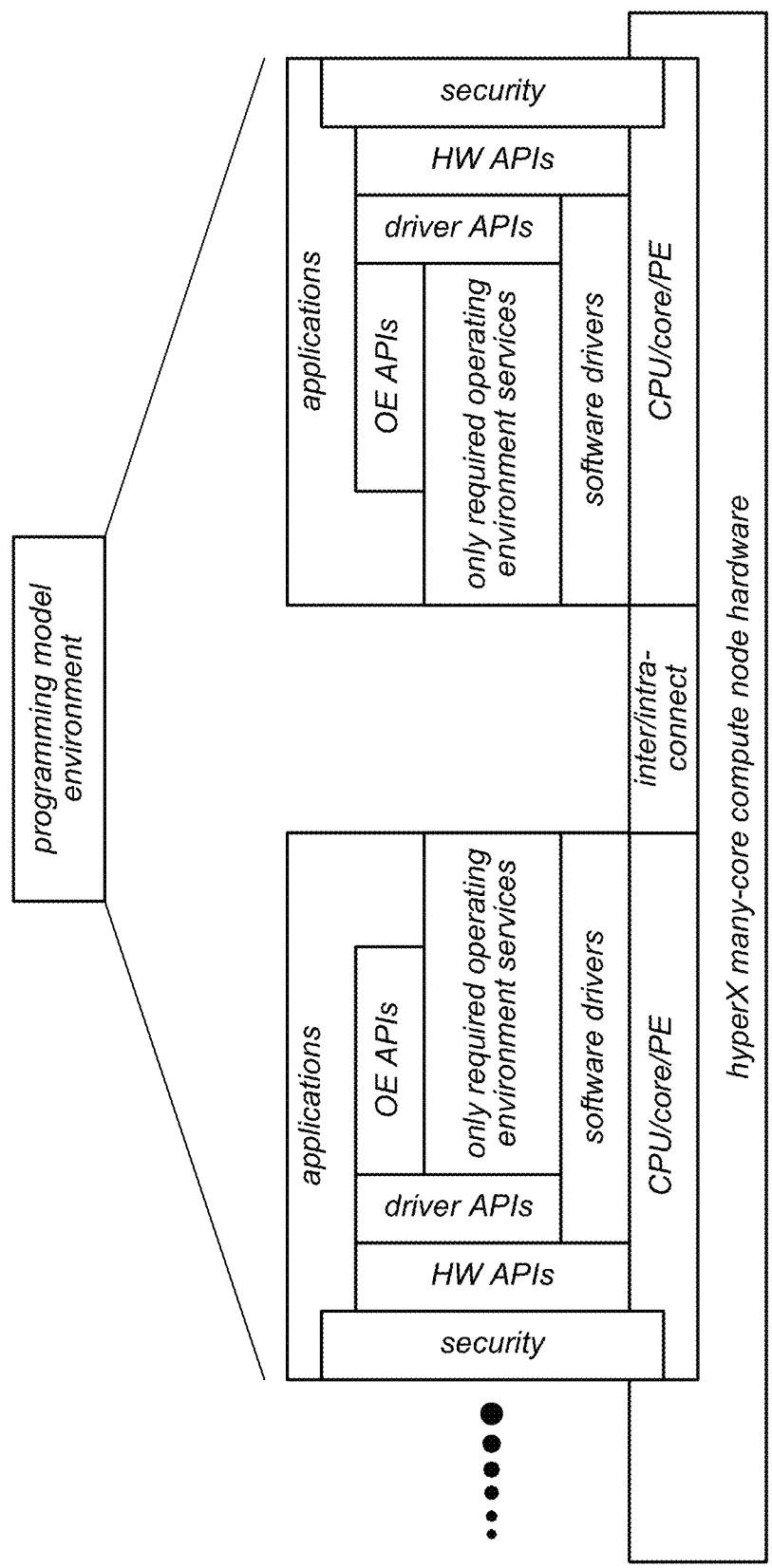
Figure 6B:
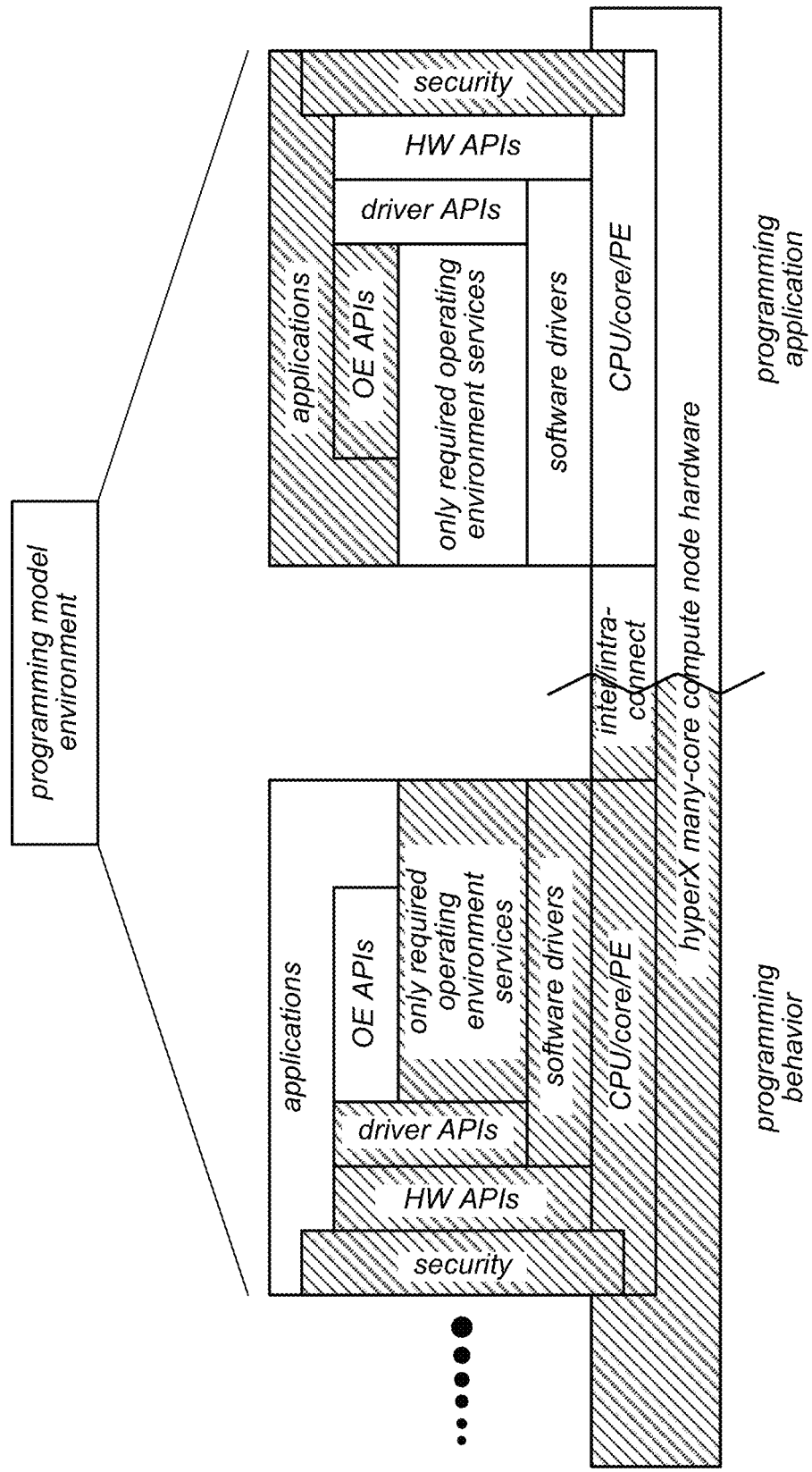

FIG. 6A illustrates an exemplary software architecture and FIG. 6B illustrates portions of the architecture that may be affected by the above-described toolbox.

Figure 7:
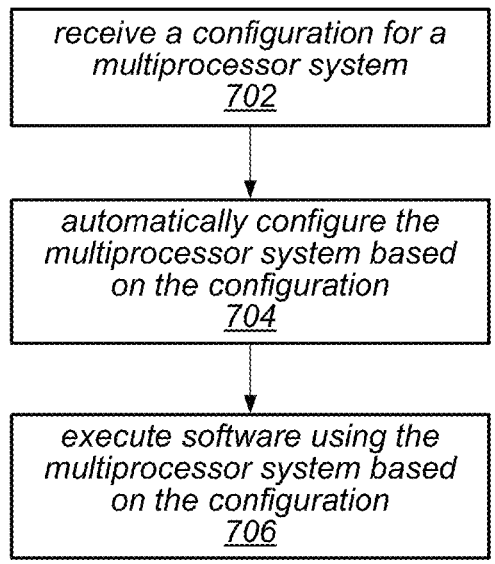
FIGS. 7 and 8 are flowcharts illustrating methods for disabling communication in a multiprocessor system, according to some embodiments.

FIG. 7—Configuring a Multiprocessor System

FIG. 7 illustrates a method for disabling communication in a multiprocessor system. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 702, a configuration for a multiprocessor system or fabric may be received, e.g., automatically. As discussed above, the multiprocessor fabric may include a plurality of processors and a plurality of communication elements. Each communication elements may be dynamically configurable and/or may include a plurality of communication ports, a memory, and/or a routing engine, among other possible elements. Each processor may include at least one arithmetic logic unit, an instruction processing unit, and/or a plurality of processor ports, among other possible elements. The communication elements and processors may be coupled together in an interspersed manner. For example, for each of the processors, a plurality of processor ports may be configured for coupling to a first subset of the plurality of communication elements, and for each of the communication elements, a first subset of communication ports may be configured for coupling to a subset of the plurality of processors and a second subset of communication ports may be configured for coupling to a second subset of the plurality of communication elements.

The configuration may specify disabling of communication paths between one or more of the processor and/or communication elements. For example, the configuration may specify disabling of communication paths between one or more processors and one or more communication elements, one or more processors and one or more other processors, and/or one or more communication elements and one or more other communication elements. As a few examples, the configuration may specify disabling of communication between a first portion of the multiprocessor fabric and a second portion of the multiprocessor fabric, e.g., to isolate the first portion from the second portion during operation. As another example, the configuration may specify disabling of memory access of a first portion of the multiprocessor fabric by a second portion of the multiprocessor fabric, e.g., so that the second portion is unable to access memories comprised in the first portion during operation.

Thus, the configuration may disable various communication paths in the multiprocessor fabric, e.g., in order to secure portions of the multiprocessor fabric. For example, the configuration may allow a portion of the multiprocessor fabric to be secured and provide security functions for the remainder of the multiprocessor fabric. As another example, the isolated or restricted portion of the multiprocessor fabric may be used to perform important functions which may need to be secure from tampering from other portions of the multiprocessor fabric (e.g., other software, which may be potentially malicious, executing on other portions of the multiprocessor fabric). In one embodiment, the configuration may specify that a first portion of the multiprocessor fabric may be able to provide data out to the remainder of the multiprocessor fabric, but may not receive data. Alternatively, incoming data to the portion may be restricted to a certain subset of the ports, which may be treated or analyzed according to secure methods (e.g., which are executing on the isolated portion of the multiprocessor fabric). The configuration may specify any of a variety of barriers in the multiprocessor fabric, e.g., for increasing security of the fabric and/or software executing on the fabric, as desired. Note further that the configuration may specify other security measures, such as those described below. Thus, the configuration may specify the disabling of communication paths, as described in FIGS. 7 and 8, but may also specify further security measures.

The configuration may be received according to a variety of manners. For example, the configuration may be received during a boot process of the multiprocessor fabric or a system including the multiprocessor fabric. More specifically, in one embodiment, the configuration may be stored in secure memory, such as read only memory or a non-volatile memory. Alternatively, or additionally, the configuration (or image/memory including the configuration) may be verified and/or authenticated using security measures (e.g., comparing hashes of the image to an expected hash, among other various possibilities). Alternatively, or additionally, the configuration (or image/memory including the configuration) may be stored in an encrypted form and may be decrypted when it is received. In another embodiment, the configuration may be received from a host system (e.g., a computer system, such as shown in FIG. 1, e.g., while testing software and/or operation of the multiprocessor system to perform a task).

In some embodiments, the configuration may include or be used in conjunction with software for execution on the multiprocessor system. For example, the configuration may be received as part of a package, e.g., which may be verified, authenticated, and/or decrypted as discussed above. Accordingly, the configuration may specify isolation or securitization for a first portion of the multiprocessor fabric, and verified software may be deployed to that first portion. Thus, in one embodiment, the hardware/software combination for that first portion may be secured via the configuration.

In response, in 704, the multiprocessor fabric may be automatically configured in hardware according to the configuration, e.g., to disable the communication paths specified by the configuration. Accordingly, the multiprocessor fabric may be configured to execute a software application (or portion of one) according to the configuration. In one embodiment, the configuring may include setting register values corresponding to one or more processors and/or one or more communication elements to disable the communication paths specified by the configuration. In one embodiment, after the configuring, the disabled communication paths may not be restorable via software.

In 706, the multiprocessor fabric may operate, e.g., executing one or more software applications, using the configuration. For example, if a first portion of the multiprocessor fabric is secured or isolated from another portion of the multiprocessor fabric via the configuration above, it may remain secured or isolated throughout operation. In one embodiment, the method described above may be performed to secure a system and may be "locked down" or secured until the system is reset (e.g., rebooted or powered off). Thus, in one embodiment, the system may be statically secured using a configuration received above.

Note that further details regarding this method are provided below, e.g., regarding the creation of "barriers" and/or other security operations.

Figure 8:
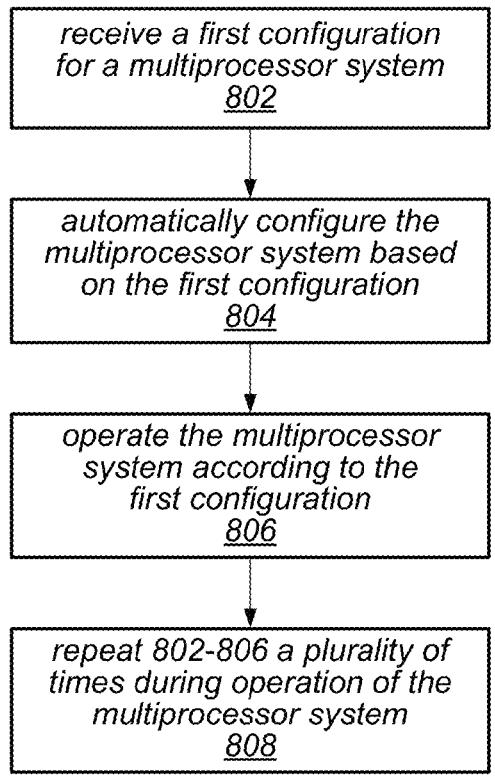

FIG. 8—Dynamically Disabling Communication in a Multiprocessor System

FIG. 8 illustrates a method for dynamically disabling communication in a multiprocessor system. The method shown in FIG. 6 may be used in conjunction with any of the computer systems or devices shown in the above Figures, among other devices. More specifically, various details described above regarding the method of FIG. 7 may also apply to this method. However, instead of the static configuration discussed above, the configuration of the multiprocessor system may be performed in a dynamic fashion, as discussed below. In various embodiments, some of the method elements shown may be performed concurrently, in a different order than shown, or may be omitted. Additional method elements may also be performed as desired. As shown, this method may operate as follows.

In 802, a first configuration for a multiprocessor system or fabric may be received, e.g., automatically. Similar to above, the first configuration may specify disabling of communication paths between one or more of the processor and/or communication elements, e.g., to provide security to the multiprocessor system and/or the software executing on the multiprocessor system. However, the first configuration may also specify other security measures, such as those described below, among other possibilities.

As discussed above, the first configuration may include or be used in conjunction with software for execution on the multiprocessor system. For example, the first configuration may be received as part of a package, e.g., which may be verified as discussed above. Accordingly, the configuration may specify isolation or securitization for a first portion of the multiprocessor fabric, and verified software may be deployed to at least that first portion. Thus, in one embodiment, the hardware/software combination for that first portion may be secured via the configuration.

The first configuration may be received according to a variety of manners. For example, the first configuration may be received during a boot process of the multiprocessor fabric or a system including the multiprocessor fabric. In one embodiment, the first configuration may be stored in secure memory, such as read only memory or a non-volatile memory that is automatically loaded at boot. Alternatively, or additionally, the configuration (or image/memory including the configuration) may be verified and/or authenticated using security measures (e.g., comparing hashes of the image to an expected hash, among other various possibilities). Alternatively, or additionally, the configuration (or image/memory including the configuration) may be stored in an encrypted form and may be decrypted when it is received. Thus, rather than being read only, the configuration and/or software may be verified, authenticated, and/or decrypted using various security measures.

Similar to 704 above, in 804, the multiprocessor fabric may be automatically configured in hardware according to the configuration, e.g., to disable the communication paths specified by the configuration. Accordingly, the multiprocessor fabric may be configured to execute a software application (or portion of one) according to the configuration.

In 806, similar to 706 above, the multiprocessor fabric may operate, e.g., executing one or more software applications, using the configuration. For example, if a first portion of the multiprocessor fabric is secured or isolated from another portion of the multiprocessor fabric via the configuration above, it may remain secured or isolated throughout operation.

In some embodiments, in 808, the method of FIG. 7 (702-706) may be performed a plurality of times, e.g., in a dynamic fashion during operation of the multiprocessor fabric. For example, the first configuration may be used to configure the system with a secure portion of the multiprocessor system executing authenticated code. In one embodiment, the authenticated code may include a plurality of configurations or modifications to the configurations which may be used throughout operation. For example, a second configuration may be received from the authenticated code and the automatic configuration discussed above may be performed for the second configuration. In this example, the initial configuration may ensure that the system is properly secured and the code is properly verified. Accordingly, the further reconfigurations and operation resulting from the code including the further configurations may continue to be secure throughout operation of the multiprocessor system. Said another way, once configured, the code executing on the multiprocessor system may be able to dynamically reconfigure the multiprocessor system during execution. Assuming the initial software is verified and secure, the operation of the multiprocessor system can therefore still remain secure.

Exemplary Details for Securing a Multiprocessor System

The following provides exemplary details for securing a multiprocessor system, such as those described above. These details are provided as examples only and are not intended to limit the scope of embodiments described herein. The following descriptions correspond to FIGS. 9-15.

A tiered or phased development and verification process may utilize a suite of software and software definable hardware to create a provably secure (including by formal methods) information security solution, e.g., addressing: Third party IP protection, Secure boot, Digital Rights Management (DRM), and Secure Processing (Red/Black).

Embodiments described herein may provide a single framework for creating provably secure information security solution through a tiered or phased development and verification process. This process, in part, may be used to secure software IP and for performing black/red processing, e.g., on a single die.

Figure 9:
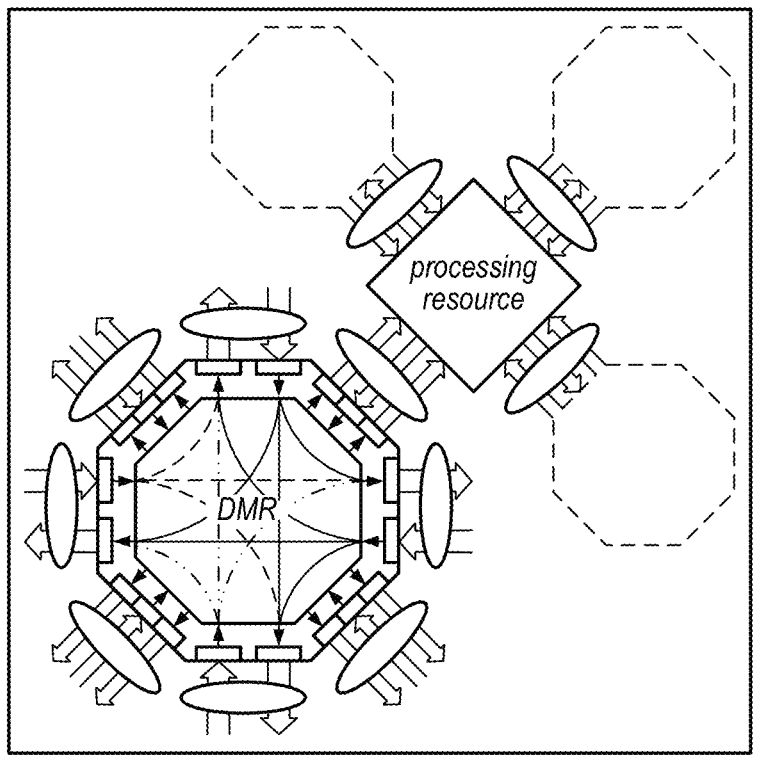

Similar to discussions above, embodiments of the invention may provide hardware enforced physical separation of isolation/security zones in the fabric. For example, FIG. 9 illustrates an exemplary processing resource and DMR as well as the ports that may be disabled, e.g., as described above regarding FIGS. 7 and 8. Isolation/Security barriers can be erected in the hardware that stop the flow of data and control, and which may provide isolation of and between regions/partitions of the processor micro-architecture. The barriers can be used to create security partitions that encapsulate the processing, memory and communications resources associated with a particular process or user. The barriers can have one or more controlled access points. The barriers can span multiple chips, but are typically constrained inside a single chip to avoid inter-chip probing (special module packaging can provide protection against such probing).

Additionally, high-performance processing for security may be available on every processing core. This includes, but not limited to (1) RSA key generation (asymmetric), (2) random number generation, (3) hash generation, (4) encryption and decryption, and (5) RSA key (and other data) storage.

The SDS2 system may guide the designer/developer through a process to protect valuable or sensitive information (data or software) from theft or tampering, both while it is in storage and while it is communicated from one place to another. At the same time, valuable information needs to be made available to authorized users, rapidly and with the least amount of overhead. These sometimes conflicting demands may be met by information security systems that integrate protocols, application software, and hardware functions (hardware assisted and software defined), and operator training. The SDS2 system may provide this cross-layer software stack (protocols, application software, etc.) development approach to software programmable hardware features under the control of software through a guiding development process to enable a security solution. The following sections describe exemplary embodiments of the system in more detail.

The Associated Toolbox for Information Security:

There are several concepts that may be needed in order to provide for information secure processing. The following subsections describe some of the toolbox for information security concepts.

Programmable Physical and Logical Isolation

A security barrier may provide the ability to secure and verify sections of the chip through physical or logical isolation/barriers to which access is controlled from within the barrier. This allows for code and data that has been decrypted to reside and run on the chip in a manner that prevents external access by a non-secured agent. It may support clearing memory on chip reset, power on, or security breach or to rebuild the same secure wall around the protected data upon these events thus ensuring that the protected code/data is never left in a non-secure area for access by anyone with non-authenticated programming access to the device.

Key Generation and Management

Key generation and management may include storing decryption keys on the chip in volatile or non-volatile memory that cannot be read or modified by non-authenticated users at the system level. It may provide the ability for the system integrator to create or load these keys at production time and secure them. Methods may be provided to permanently lock these keys into the secure storage without any reprogramming or to allow for them to be temporarily locked and later modified by a secure, authenticated user. In descriptions herein, a one-time programmable (OTP) type memory or random number generation based on physically unclonable function (PUF) that is able to generate appropriate repeatable unique entropy based on physical properties of the hardware or hardware ring oscillator based random number generator (RNG) is referenced in order to provide a reference when details are needed for further explanation. The random number generation may be supported in both hardware and through software.

Encryption and Decryption

Both code and data can be loaded onto the chip in an encrypted stream and have it decrypted on the chip for use. Once decrypted, it can be protected from external access or modification, even after chip reset. This can be done through a hardware engine, but for maintaining full software definition, a software engine loaded through the programmable boot mechanisms can be used. This keeps the implementation consistent with the hardware assisted software model methodology.

Authentication

By providing some sort of public key type information (e.g., software key, hardware key, biometric information, etc.), protected code can be used to authenticate the user and allow access to either use the existing programming or at a higher security level to modify it. This may be a software or hardware implementation accessible through programmable booting. This feature can be used to implement Digital Rights Management functionality, for example.

Programmable Boot (Supporting Secure and Non-Secure)

Secure boot provides a customizable software definable boot sequence to boot up the chip (and system) in a manner in which it is fully protected and secured. Physical access to the pins of the chip may not be possible once the secure boot is enabled. Accessing or changing any of the secured code or data on the chip or in the system (loading onto the chip) may require authentication. A system reset or power cycle may cause the chip to run this mode and secure all the required code and data prior to any user-level access being allowed. A mode can be programmed where the boot code can be permanently locked or be allowed to be changed by an authenticated user.

Figure 11A:
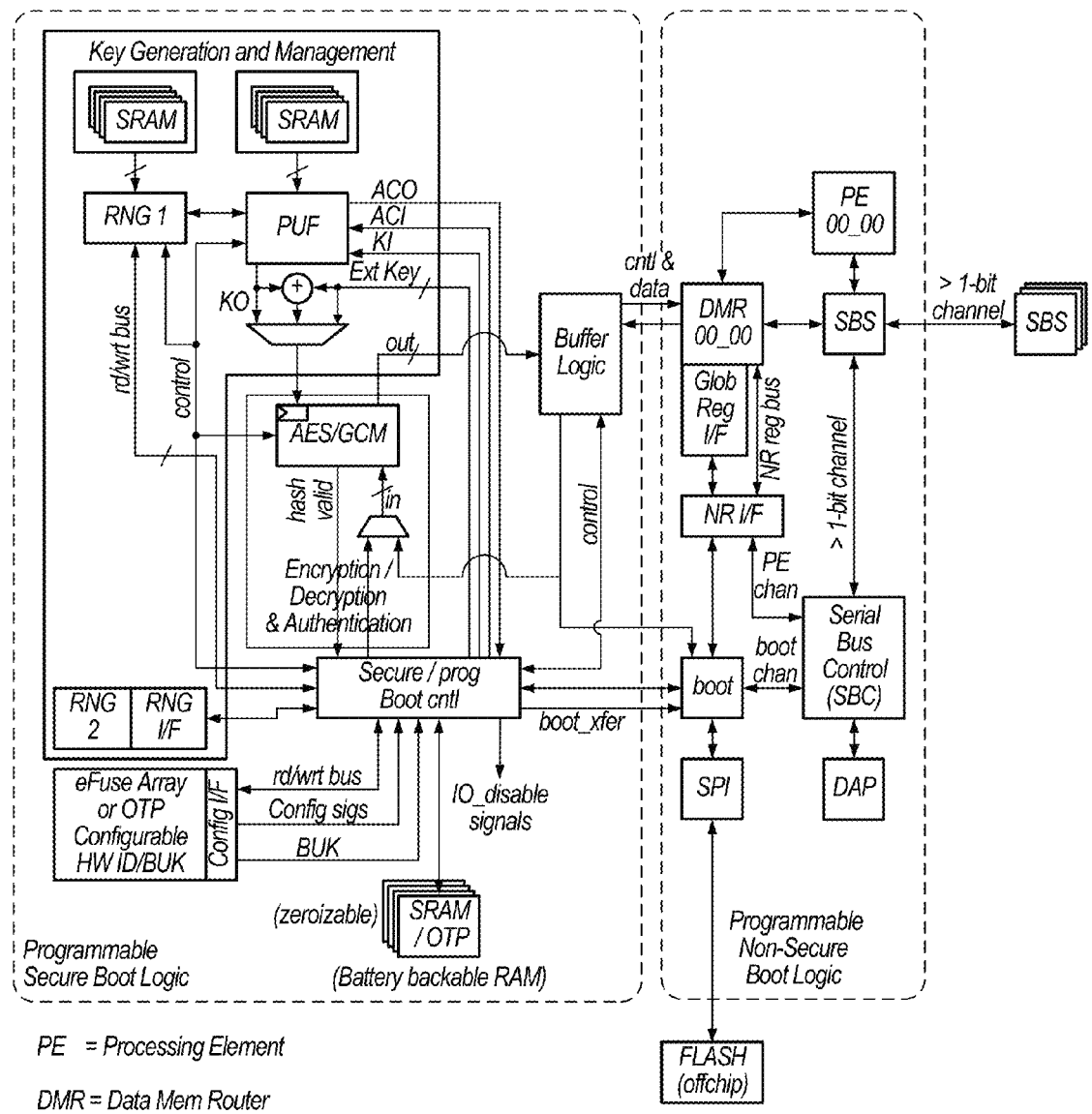
Figure 11B:
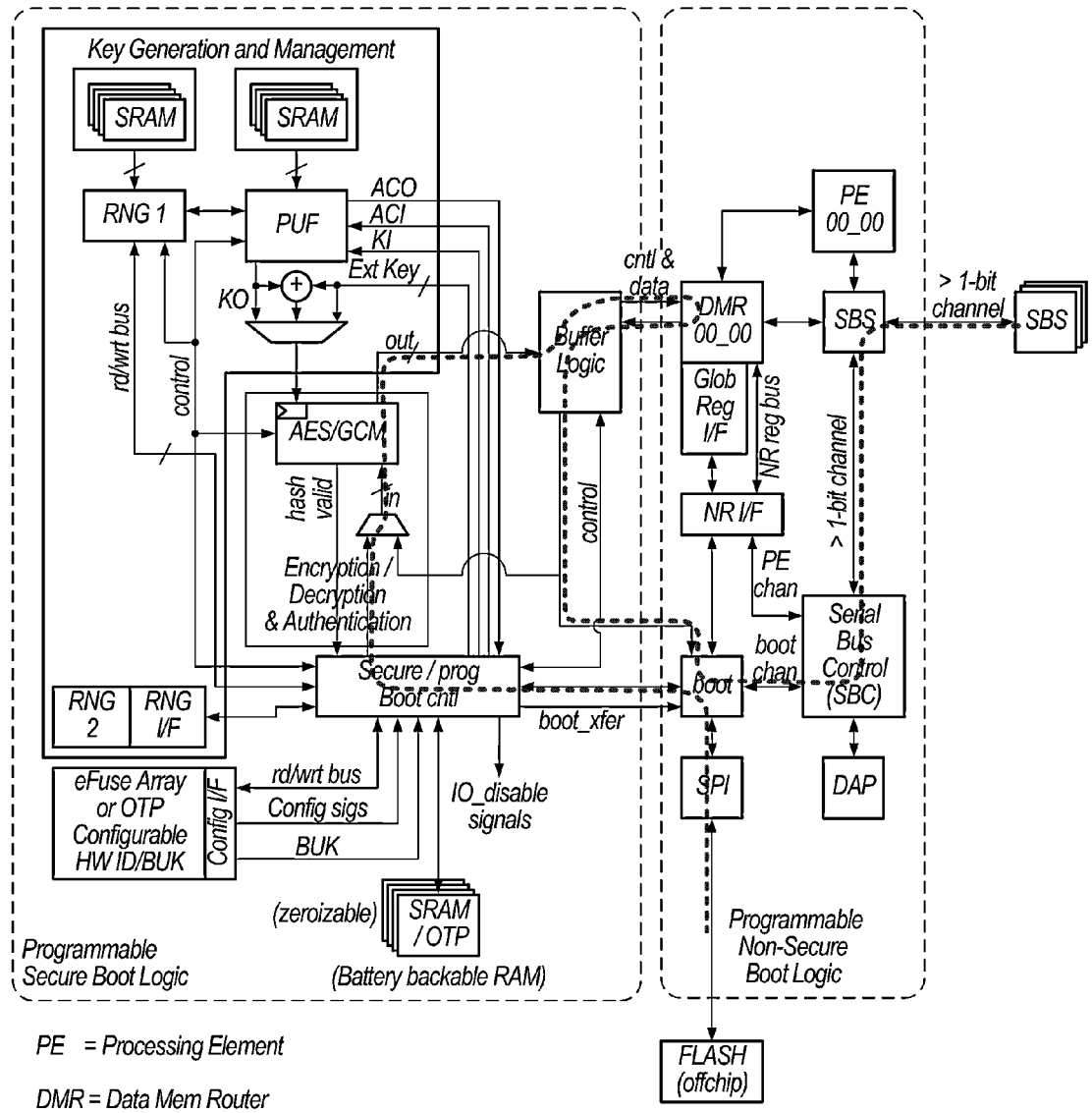

FIGS. 11A and 11B provide exemplary overall block diagrams of a secure boot system. From these Figures, the basic security blocks provided and how they connect into the other chip hardware can be seen. This design may use the memory available in a DMR as a memory buffer for use in processing the secure boot code. With this functionality it is also possible for a PE to use the DMR for buffering data that can be encrypted, decrypted, signed or authenticated by the provided hardware blocks in mission mode. In addition, the memory buffer can be used in setting up a serial bus command sequence in memory to send to the serial bus controller via a DMA channel in the DMR. This process may improve the overall efficiency of algorithms requiring these functions and the DMA usage can free up the PE for other critical processing tasks. FIG. 11B illustrates exemplary data flow with some minor control flow also shown.

In more detail, FIGS. 11A and 11B illustrate a HyperX Advanced Security Block Diagram. Note in the figure that there are several different uses for the OTP delineated. From an architecture standpoint these memories could be a different configuration in both size and number, depending on a particular implementation's needs. The main memory (program store) is the largest of the group shown. In addition to this there are smaller memories, one for user/security scratchpad and the other for Multi-Time Programmable (MTP) emulation. This is used to configure the main memory into multiple, re-mappable pages such that errors can be corrected and/or keys can be modified or replaced. This is configurable via programmable bits such that certain pages can be permanently locked and others can be accessed by program controlled authenticated users. This allows for security as required as well as for field upgradeable code/keys if desired. Note that the functionality and uses of these memories can change slightly based on different non-volatile memory technology used. For instance, much effort and logic is used here to emulate multi-time programmability with OTP. In the case of a multi-programmable non-volatile technology (such as FLASH) this effort and logic would be redirected toward the locking of the inherently re-writable memory.

The IO disable signal is used to keep the chip IO disabled during the secure boot process so that external access is not allowed until the security walls have been built, thus making pin-level security protection unnecessary. An option is to keep this asserted (JO disabled) even during the rest of the boot process (except for the SPI pins needed to continue the boot externally once the secure portion is complete).

Another feature that is supported in the OTP registers is the ability to turn off the full-chip scan ports once the chip has been fully manufacture tested. This provides for an additional level of security at the system level.

The chip may use several modes, e.g., for proper functionality. The modes can be controlled by the writable, non-volatile storage (fuses) [configurable] shown in the FIGS. 11A and 11B. Additional non-volatile storage may be provided for use as a Backup Key (BUK).

The PUF may be an integral part of the RNG1 circuitry. It may also be accessed for random numbers in mission mode. An additional random number generator (RNG2) is also provided for mission mode. It may have different hardware design than RNG1 to provide an alternative approach, e.g. a hardware ring oscillator.

There may also be a small RAM provided with an option (provided via a packaging option) to be battery backed if volatile. This memory can be used as battery backed storage of system configuration/provisioning information, optional key storage, the storage of AC bits or can even contain enough boot code for a small boot operation (enough to program PE or two). This RAM can be zeroized if a tamper is detected, in one embodiment.

The secure boot control section may provide for the state machine control to initialize the secure boot hardware and perform the secure boot sequence. It may also provide the control to configure the operational modes of the IP blocks and to enable/disable those blocks based on configurable hardware settings.

Tamper Detection

A tamper detection input (either multiplexed with another or separate) may signal that tampering has been detected. This may be used inside the chip to signal that a change is functionality is desired. Based on user programming, it can cause 'zeroization' of the memories (or memories put into an indeterminate state) and optionally convert the boot mode back into a state where the secure code is no longer read from the OTP, thus rendering the device non-functional with respect to the onboard secure code. At this point, the only way to see the secure code may be to physically read the bit locations which may be controlled purely by the secure nature of the non-volatile memory chosen for use. Other features may be enabled or disabled upon this signal via program control. In addition to this pin, the lid of the package may also provide tamper detection signaling if removed.

Software Development Process

Figure 10:
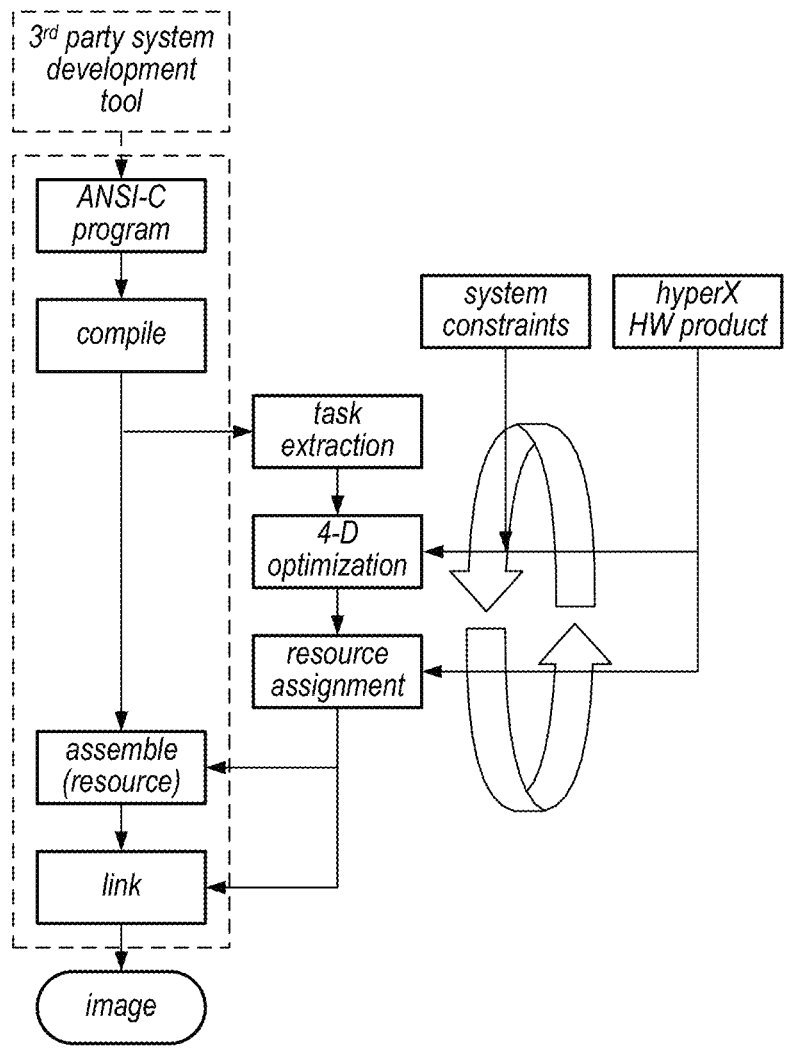

FIG. 10 illustrates an exemplary HyperX development system supporting the SDS2 methodology and process. The software development process may build on the underlying capability illustrated in FIG. 10 where system constraints extend to identify security requirements at each phase, implementation method chosen (SW and HW features), formal method to prove assurance, verification of system functionality and performance that is supported by full simulation and testing through a fully programmable and customizable security development environment solution.

Enabling Hardware Features

The HyperX system may involve a software based solution. As such, the security implementation (barriers, key management, authentication, decryption, etc.) may be implemented in a manner that is consistent with this model and keeps it as software running on the HyperX platform. This may prevent the design and implementation of custom hardware that can at best provide a small subset of possible solutions.

The HyperX hardware/processor may include hardware 'hooks' that allow for these software solutions to be designed and implemented. As such, in one embodiment, this design may be considered 'hardware assisted software based, verifiable, security'. It may provide the essential elements required of a pure hardware solution and the security that comes with it with the reconfigurability of a software solution without its inherent security holes.

Example

PE_0_0 (or a specific processing element(s)) may be chosen as the starting point for the security implementation. Additional or different PEs may be chosen for use based on other design considerations without changing the intent of the design. A one-time-programmable (OTP) type memory is connected to the associated Null Router register bus that is accessible (by default) by PE_0_0 and the DAP (via the boot controller) for programming. Note this is two possible read/write paths to the OTP memory. This is not meant to limit the design to only two paths but is chosen as only two for the current design point. In all cases, each path its accesses may be individually secured within the programming structure. Once it is programmed the OTP may be locked so that it will no longer be writable or readable by PE_0_0 or the DAP. This behavior is programmable by the system designer. This protects it as a secure area and allows both decryption keys (both key-encryption-keys or KEKs and the encrypted master keys) as well as secure, non-encrypted code to be stored here. This programming and protection of the OTP can be done on a per page basis. A page can be written and read by the PE or boot controller until its security information is configured. This allows it to be verified correct. Writing the selectable security bits allows control of read/write access to be fully locked or partially locked for all users or only for non-authenticated users. This, along with a programmable value of what page to start the boot in, allows for boot code to be replaced with new code by using new pages of the OTP.

Prior to the programming of this OTP the chip behaves in normal operation and boots from SPI (if the pins are so configured) and allows parallel boot mode access via the normal ports. Once the OTP is programmed, then on reset, the chip may have all the parallel ports and DAP disabled and secure boot controller logic may boot the chip from the onboard OTP memory. This boot can completely secure an area and load a decryption engine that can be used to authenticate users via a port on the chip. Note that no external access is allowed during the secure boot portion. Because of this, pin access does not need protection. Once the section is secured the boot is handed over to the standard boot controller logic and the ports are all enabled. Now the non-secure code can be loaded normally.

Since it is fully programmable, the secure boot portion can also load a small, secure decryption engine that then processes the remainder of the boot process through PE_0_0. Now fully encrypted code and data can be loaded from off-chip and decrypted by the engine as it is loaded onto the chip. This allows for much larger portions of the chip to be running in secure mode than might be possible from a small OTP.

Multiple secure boot images can be supported. This allows for production chips to have some preconfigured security code loaded into them at time of manufacture to enhance the basic security features of the chip as delivered. One possible use of this feature is to provide a memory 'zeroizing' (or placing in an indeterminate state) functionality on reset such that all memory contents are cleared prior to user level (pin) access being enabled. There are other potential uses also.

Emulation of the secure boot mode may be available through the current SPI port on the chip. It can be used to simulate the OTP for bring-up and debug of security algorithms without the need to program the OTP. This may allow the development environment to fully test the secure system via the existing port and then program the OTP once it is fully developed and debugged—supporting no modification to run in emulation mode versus OTP mode.

An alternate method for programming the OTP is via the external DAP. In both this mode and the originally described method of PE_0_0 programming access, one or more pages of memory can be left unprotected and allow PE_0_0 access for storage of encrypted key data. It is possible to individually select read and write access protection for both PE_0_0 and DAP.

The following features are addressed are organized under two groupings based on potential use case. The first group is based on primarily focus to support static security result. In other words, the areas, once secured, may remain in effect until a chip reset or power cycle occurs. While this is a necessary functionality for implementation of secure processing and sufficient for a subset of potential applications it is not a complete solution for all security needs.

The second area is based on supporting dynamic security barriers and/or a combination of static and dynamic security barriers and facilitate higher-layer security concepts.

Static Security Barriers

The following features, tools, provide a baseline to support static security operational needs. Explanation is provided as deemed necessary to clarify.

Memory Bus Design, Startup Sequencing (Reset . . . ), MTP Emulation, Register Specification (Bit Definitions), and Example uses and numbers for configuration bits.

The following table illustrates an example Register Specification:

TABLE 1

Example Register Specification

| Use | Count |
|---|---|
| Tamper Response Select | 2 |
| Zeroize Memory | |
| One-ize OTP | |
| Kill Secure Boot Function | |
| DAP Trusted/Open | 1 |
| PE_00_00 Trusted/Open | 1 |
| Read Lock | 1 |
| Write Lock | 1 |
| Secure Boot Mode | 2 |
| Original 00 | |
| Secure 01 | |
| Reverted 11 | |
| Unused (or also secure) 10 | |
| Disable Scan | 1 |
| Full DAP disable | 1 |
| SPI disable | 1 |
| TOTAL | 11 |

Programmable Boot Sequence

This is the ability to control the boot sequencing with programming. This can be controlled with bits in the OTP but if a minimal design is to be realized without OTP this can be controlled with some register bits that have special reset logic. It may support the ability that the chip can boot up and reprogram it's boot sequence and then restart it. This may allow for some secure emulation to occur without non-vol bits on the chip.

One method to implement is building a table of boot addresses similar to the table planned in OTP to allow different boot sequences to run, some can act as if they were secure and coming from OTP and then transfer to 'normal' boot process (except not from address 0, CS 0 as this one is used to boot the initialization sequence to get this all started.

When a register location is written, the boot controller may restart based on its current programming. By default this may be the same boot as the one controlled by the pins at chip reset. If the programmable boot portion has been programmed then the boot may proceed as programmed via software. This allows much s/w control of the boot process as well as secure boot emulation.

Memory Partitioning/Addressing

Figure 12:
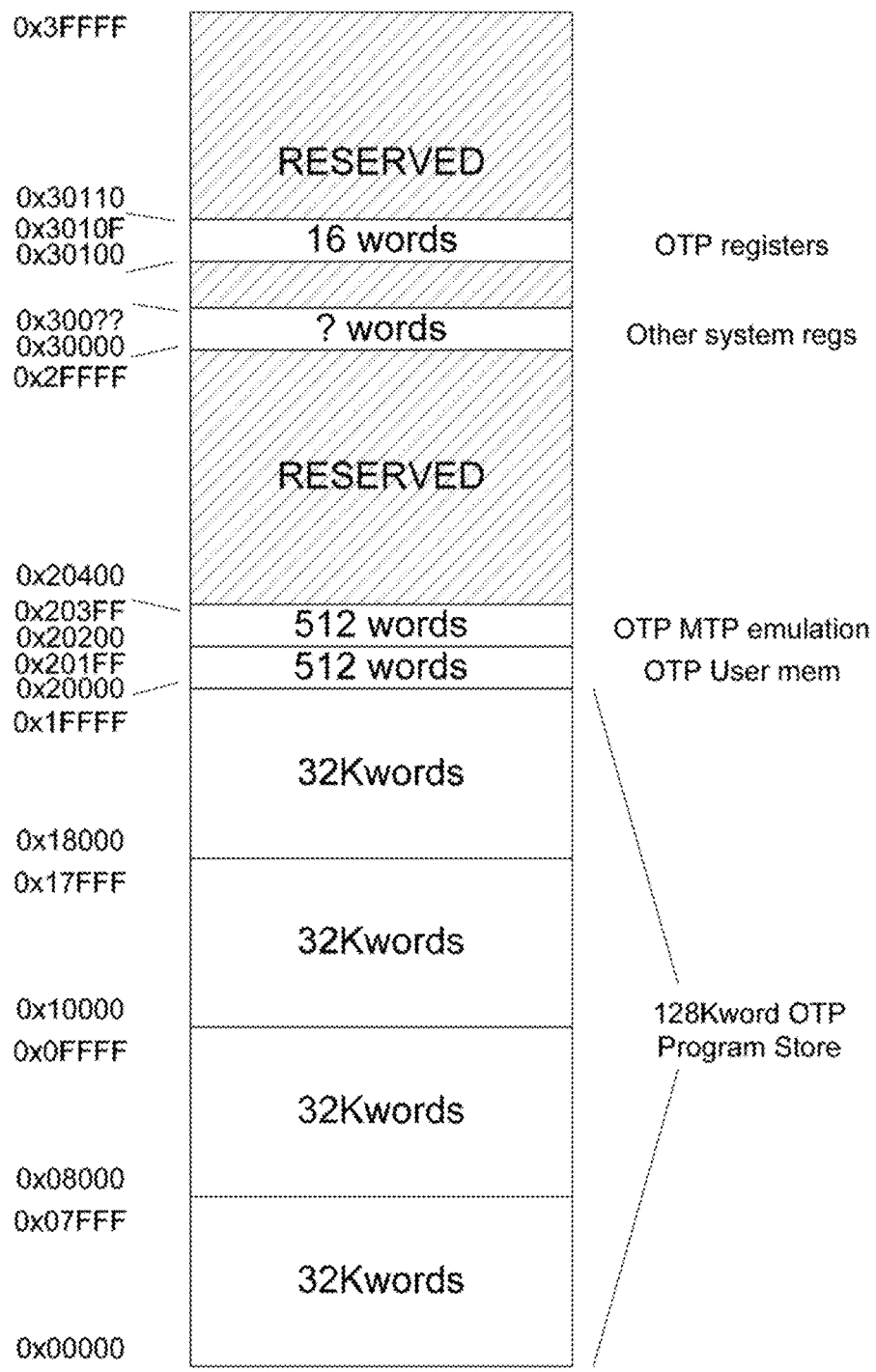

FIG. 12 illustrates an example Memory Partitioning/Addressing Register Map. FIG. 12 shows an example memory map for the 256K word OTP memory space. These registers start at address 0x30000. Since these are the first things that need programming it makes sense to make the 10-bit pointer register initialize to the high order address bits of these registers or 0x300.

These 18 address bits may provide a 256K word memory space for 128K of program store in the first half of the space and the rest as shown. Using a 10-bit pointer for the MTP emulation part may provide 210 or 1024 blocks of memory where each block contains 128 16-bit words. (128 words*1024 blocks=128K words). If an additional 6 bits of control are used at each pointer then they may be 16 bits in length and there may be space for 512 entries in the MTP table.

For the addresses on the NR bus there may be a 10-bit pointer register that is loaded in the 'normal' address space. The 8-bits of address available on the bus now may be used as an offset to the rest of the address map. Each 'page' may be 256 words. Initializing this pointer to 0x300 as previously mentioned may give initial, extended addressing to the register space of the map.

It may be possible to have all the registers needed in the 'normal' 0x1Exx memory space in which case the extended 'other registers' of this map may not be needed. The extended space may be accessed using the extended map on the NR bus in the 0x1Dxx NR bus space. It this is done the OTP registers should be moved to start at the extended address 0x30000.

The memories are anticipated to be of the type that read and write 32 bits at a time and the additional address translation may be done by the bus controller. The register interface is yet to be determined and the map is just a place-holder.

IO Disable Logic

The IO disable has a signal for the SPI port and one for all the other ports. This supports emulation. When the 'emulation' bit is set and boot occurs from off-chip instead of OTP. Once OTP boot is enabled, the SPI disable toggles the rest of IO disable.

Rd/Wrt Lock Control

Includes/supports both DAP and PE_00_00 control.

NR Bus Interface

The NR register bus interface has an 8-bit address bus available. The DMR maps all these addresses into the 0x1Exx space. There are several holes in that space if needed as well as the entire map from 0x40 to 0xFF to use for extensions to the boot controller for programmable boot. There needs to be a continuous address space of 256 words (8-bits) available to use for accessing the new memory in banks via the NR register bus. To do this the space from 0x1D00 to 0x1DFF may be utilized. 1E to 1D for this section can signal the h/w that these are OTP memory transactions.

Using the 8-bit address from the NR bus concatenated with a 10-bit bank address from a new register there may be an 18-bit memory address that is capable of accessing a 256K word space as needed (see section on memory address map). This bank register may reside in the 0x1Exx space in order to provide access no matter the current bank pointer value.

Commands

Commands are for supporting boot features: NR, SB, and DAP, etc. Types of commands include: NR cmds, SB cmds, DAP cmds.

Security/Locking for OTP

Tamper Detection and Actions

Tamper detection supports an action to zeroize memory and stop booting, operation, etc.

OTP Power Options

The OTP sections can be shut off if the OTP is non-functional and still use the chip in a non secure boot mode.

Secure Boot Emulation

The secure boot mode is emulated using the standard boot mode. This allows for the entire program to be developed and debugged on a development system prior to programming the code into the very limited reprogrammable OTP memory and finalizing the secure boot.

Hardware RNG Support

A truly Random Number Generator (RNG) supported in hardware provides high security levels. Key Generation is also provided.

On-chip Security Barriers—Creation and Verification

Disable Full Scan

A bit in the configuration register (OTP) controls the full scan functionality of the chip so it can be disabled in secure mode.

Tamper Signal(s) in Top Metal

A tamper pin on the chip where there are signals routed in the top-layer metal that when broken may signal tamper and disable the secure functionality (chip is in default 3100 mode) which means the only way to see the secure code is to physically read the bits in the OTP. May also be set-up to 'zeroizing' code if present.

Package Tamper Signal

Programmable, so that removal of the package lid also signals a tamper and does the requisite disables (see other tamper information).

Zeroizing Memory

Provides the ability (using the multiple boot sequence) to force a particular piece of boot code to always run that zeros all the main chip memory before anything else happens. This feature can be used for other purposes also.

Tamper Handling

Through programmer control as part of the configuration bits in the OTP.

Disable Secure boot logic completely and make chip a non-secure chip permanently; Force reload of all secure boot code (puts it on the serial bus so might be detected and read); Run zeroizing code to zero all dynamic memory Field Reprogrammability Supports reprogramming the device in the field should the system designer want this functionality enabled. This can be controlled through authentication techniques discussed.

Scratchpad Key Storage

Supports scratchpad OTP regions that protects data from read/write access by any but secure processors controlled by authenticated users.

Page Mode OTP Access

JTAG

JTAG may not able to be used to gain access to disable security on the chip. Or JTAG can be disabled completely.

Software Tamper Signal

Provides a method that software can signal 'tamper' to the secure boot controller so that actions can be taken. Each tamper signal is individually selectable on the action programmable (different security levels, based on severity of type of tamper).

Partial Reset

Supports partial reset of the chip with and without security. Example us is quadrants dynamically powerable.

Dynamic Security Barriers

The following features, tools, provide focus on support of dynamic security operational needs. Explanation is provided as deemed necessary to clarify.

Dynamic Barriers

Method for allowing barriers to be moved, removed, built, or otherwise modified while the chip is running. This allows for more OS type operations.

Trusted (Secure) Processor

A method to mark a running processor in a manner that says it is trusted and allows its instructions to run in some sort of 'supervisor' mode that allows access to things an untrusted processor cannot do, like security partition modifications. Many methods to this, including through secure boot completion having the ability to send a secure token to a PE (under program control) that marks it as trusted.

Runtime Secure Boot

Provide a way that if some sort of compromise (tamper or other) is detected (or just under s/w control) that the secure boot code can be re-run to re-secure that section of the chip. This requires much of same logic as dynamic barriers, probably.

Tamper Visible Code

Provides a method where the boot code (both internal and external) can identify if changes have occurred to the code. It then signals if boot is complete w/o error, etc.

Trusted SB Commands

To reprogram secure regions, one method is to use Serial Bus in the trusted/secure command mode. This allows real-time editing of security settings for runtime/dynamic reconfiguration. This intended only to be issued by a trusted processor. DAP/SPI (external) commands are non-trusted in this example.

Secure Code Segments

Idea of having a code segment somehow marked that says it can only execute on a secure/trusted processor within a secure region of the chip.

SB Security Support

A method to support multi-cast/mult-open/broadcast type functionality to provide more efficient zeroizing of code. Could use the serial bus. All memories could be opened for writing at once and the zeros sent once. An example sequence of: OPEN ALL, SEND 4K block of 0 to DM, SEND 2K block of 0 to IM, CLOSE ALL. This would take about 210 microseconds to occur at 500 MHz.

Software Control of Boot

This allows secure/trusted processors the ability to control the boot flow. Allows for a two or more level boot process where varying levels of security are supported for the purpose of allowing field modification based on extremely high level authentication. Can provide for multiple encrypt/decrypt levels, etc.

Boot JMP Instruction

Allow the boot controller to jump to a new address to continue the load. Improves the efficiency of some of the multi/secure boot code.

Other Non-volatile Memory (e.g., FLASH)

Potential uses abound

Security Algorithm Acceleration

Provides additional acceleration at a fundamental level, where parallelism is not sacrificed for some aspects of security algorithms.

Code Validation

Method (Checksum, hash algorithm, or something similar) that supports processing during code loading (in hardware) that may validate that the code has not been tampered with or that no mistakes were made during the boot load.

Serial Bus Hardening

Methods that make the secure boot process more secure. An example is replicating portions of the serial bus logic and cause a 'negated' version of the normal programming switching to occur, thus obfuscating the power footprint making it more difficult to sense the programming from off-chip. It can be turned off to save the power in non-secure applications and allows for easy validation as to the security provided by the feature. Other examples include widening the serial bus, etc.

Example Usage Scenarios

Third Party IP Protection

There is a need to provide mechanisms such that third party Intellectual Property (IP) applications can be developed and sold to system developers using HyperX hardware while protecting both the ownership rights of the IP owner and the confidentiality of the IP. Two primary requirements for such a system are that there may need to be: a method to simulate the IP during system software development by the purchaser of the IP; and a method to deliver and install the IP in an authenticated running hardware system while still protecting access (e.g., through encrypted binaries that are decrypted only at runtime and with run control based on a license token).

Three potential scenarios using the features previously outlined are discussed in the following sub-sections. Other potential models may also exist. The goal is the hardware hooks and software programmability allow for innovation in all areas. The difference in these three scenarios resides in how the development simulations are performed.

Hardware Based Cosimulation

For this scenario the IP is delivered either pre-programmed into the non-volatile memory of a HyperX chip or provided in an encrypted binary form in a file to the system/software developer For the pre-programmed case the IP may boot into and secure a section of the chip such that it cannot be read from the chip. The interfaces for the block are extended to HyperX IO ports and made accessable to the simulator through additional boot code that can be loaded by the simulator after the protected IP is loaded. The simulator now runs the developer code in simulation while interfacing calls to the IP block through the hardware interface on the board. This provides a method to secure the IP in such a way that the user of the IP never even has a copy of the binary in file form.

For the second method the IP is delivered in an encrypted binary form. A 'standard' decryption engine may be previously programmed into the HyperX and a key provided to the IP user. The IP can be loaded and decrypted using the software decrypt engine and the provided key. The same methods are used to extend the interface to the chip JO and interface into the simulator. This requires a bit more development and cooperation between Coherent Logix and the IP providers to either develop standard or custom decryption engines for use.

This co-simulation scenario provides a way to develop using the protected IP that requires very few changes to the existing simulation environment except the definition of a socket layer for the interfaces on the hardware of the development system in support of the co-simulation. However, it does require the use of the development system hardware for all simulations.

For both methods, once the system development is completed the same IP binaries that were used for development are then used for production of the system without the additional co-simulation wrappers. This provides an extremely high confidence that the system may be functional.

Software Only Simulation

For this scenario the IP is delivered for production in much the same way as was described above for the co-simulation version. However, for simulation during development an encrypted simulation binary (it might be possible to use the same one, still) is provided. The simulator supports decrypting and protecting this IP during simulations. Protection is enabled in the simulator, just like the chip, to prevent dumping, disassembly, tracing, breakpointing, etc. within the IP code once decrypted and loaded. The decrypted coded may never be resident in a non-secure area.

This method provides simulation without the use of development system hardware.

Application Code Distribution

Under these scenarios, encrypted binary files are the primary delivery mechanism for the IP and there may be methods to link this encrypted binary image into the application code object file while maintaining the confidentiality and authentication requirements of the IP. These methods may need to support IP modules from multiple vendors within the same object file (and potentially nested IP if one IP module is based on another IP module). The boot sequence of the HyperX processor in the system may handle the decryption and authentication process using the same keys used during simulation as described in the previous sections. These keys can be stored on-chip as described in section below on DRM.

Secure Boot

There may need to be a method to boot the system where the boot stream cannot be read in a non-encrypted form on any pins of the HyperX. This is performed through the programmable boot. With this capability, code can be loaded at boot time with the pins of the chip completely disabled. Once the code is loaded it can be secured by building security barriers around it with the provided hardware hooks. A plaintext bitstream may never exist on a pin of the device and cannot be read back out once a secure barrier is formed around it in the array. Access into and out of the secured area can be completely controlled by programming within the security barrier.

It is possible for some use cases that the entire program may fit within the non-volatile memory on chip. In cases where this is insufficient a simple decryption engine can be loaded at boot time. This engine can be used with a public key and an encrypted binary to load the chip with a larger program image. This provides a mechanism for secure boot where the actual chip programming resides off-chip, but only in an encrypted form.

In order to further protect the programming, tamper detection is provided that can be used with the programmable boot functionality to cause the protected code to be removed from memory, re-protected via a new boot, or simply to cause the chip to become completely non-functional in an extreme case. This is completely under system programmer control at the programming time of the system via non-volatile register bits.

Exemplary Secure Boot (e.g., Corresponding to FIGS. 11A and 11B)

The chip may be configured for secure boot via configurable programming or secure boot emulation mode. The data paths used for the secure boot may be from off-chip FLASH.

The secure boot process (using both authentication and decryption) is as follows:

1) The boot controller is configured to use the SPI to load the Activation Code (AC) from the FLASH. Optionally, the boot controller can be configured to load the AC from the battery backed RAM.

2) This AC is sent to the PUF H/W on the ACI bus and is used there to regenerate the Secure Key which is sent to the AES/GCM engine for use in decryption and authentication via the KO bus. If the PUF does not authenticate the AC then the boot may fail and processing may halt. This is considered a s/w tamper detect and the action selected for this tamper may be performed. The PUF is one source of Secure Key material. It is also possible to configure the h/w to use a key that has been stored in the battery backed SRAM or in the eFUSE array instead of the key provided by the PUF using an AC. These on-chip keys may also be XOR'd with the key from the PUF for yet another version of the secure key.

3) The start of the boot stream either follows the AC (if used) or begins at the beginning of the boot storage selected and the boot controller now begins loading the first encrypted and signed data stream segment. The source is selectable to be off-chip FLASH or on chip sources. In order to be secure, the controller loads the segments one at a time, decrypts, and stores them in the DMR memory buffer so they may not be used to program the device memories until they are authenticated.

4) The stream from the FLASH or battery backed RAM is sent directly to the AES/GCM engine in appropriate block sizes for decryption and hash generation for authentication.

5) The AES engine may decrypt each block in the segment and store it in the current DMR memory buffer. In order to prevent segment reordering, the first command in each segment may contain a sequence number command. Instead of going to the DMR buffer this command is sent to the control to ensure that all segments are loaded in order. If an out of order segment is detected the boot may fail and a s/w tamper may be signaled.

6) In parallel the AES/GCM engine may reconstruct the signature hash for the sequence of blocks. When the sequence is finished the final hash compared to the signature which is provided at the end of the boot segment.

7) If the signatures match, this segment is authenticated and the control may set up a DMA to copy this stream of commands to the Serial Bus Controller (SBC) for programming of the device. If any signature fails to match then the stream is considered non-secure and the chip may cease the boot process and a s/w tamper may be signaled.

8) While this segment is being sent another segment can be read from the boot memory source, processed as above and stored in the other half of the double buffer. This may continue to ping-pong between these buffers until the boot is complete. This method of double buffering allows the boot stream to be completely processed and loaded on the chip with only the extra latency of the processing of the first buffer plus whatever overhead is inserted in the processing of each segment by the logic discussed.

The secure boot may support both programming the secure behavior of the device and loading the applications to run on the device.

Digital Rights Management (DRM)

Digital rights management is used here as a catchall category for any type of dynamic user authentication such as password, biometric data, smartcard, secureid, downloadable license key, etc. type of authentication. A section of the chip can have the authentication code loaded and protected at boot time via the secure boot methods. The non-volatile memory on the chip can be used, in addition, to provide static key storage. Mechanisms are provided where the static keys can be updated via the multi-program emulation for the non-volatile storage. Multi-tiered authentication is also possible where a key encryption key is provided in the secure storage and other rights management keys are sent into the chip in encrypted form for later decryption. This allows for large offchip storage of DRM keys.

Data moving between HyperX and other devices may be secured (e.g., always) in encrypted form by using combinations of the methods provided. This maximizes the security by limiting clear text access to important data.

Secure Processing (Red/Black)

From the previously presented scenarios it has already become clear that sections of the chip can be 'walled off' and secured from non-authenticated access. Using one or more of these areas the chip can be divided into sections in which data can move in encrypted form only (outside a secure region) or in decrypted form in a secured region thus providing both black and red region processing on a single chip with total system designer control.

Access to and data movement to/from a secured region can be put completely under the control of the trusted code running in that region. This code can be loaded from the on-chip non-volatile memory at boot time and secured and thus not subject to any pin snooping even if pin access to the HyperX is not secured.

Example System

The following figures provide an example system using the features outlined.

FIG. 13 illustrates an outline of security requirements and how they are intended to be addressed.

Figure 14:
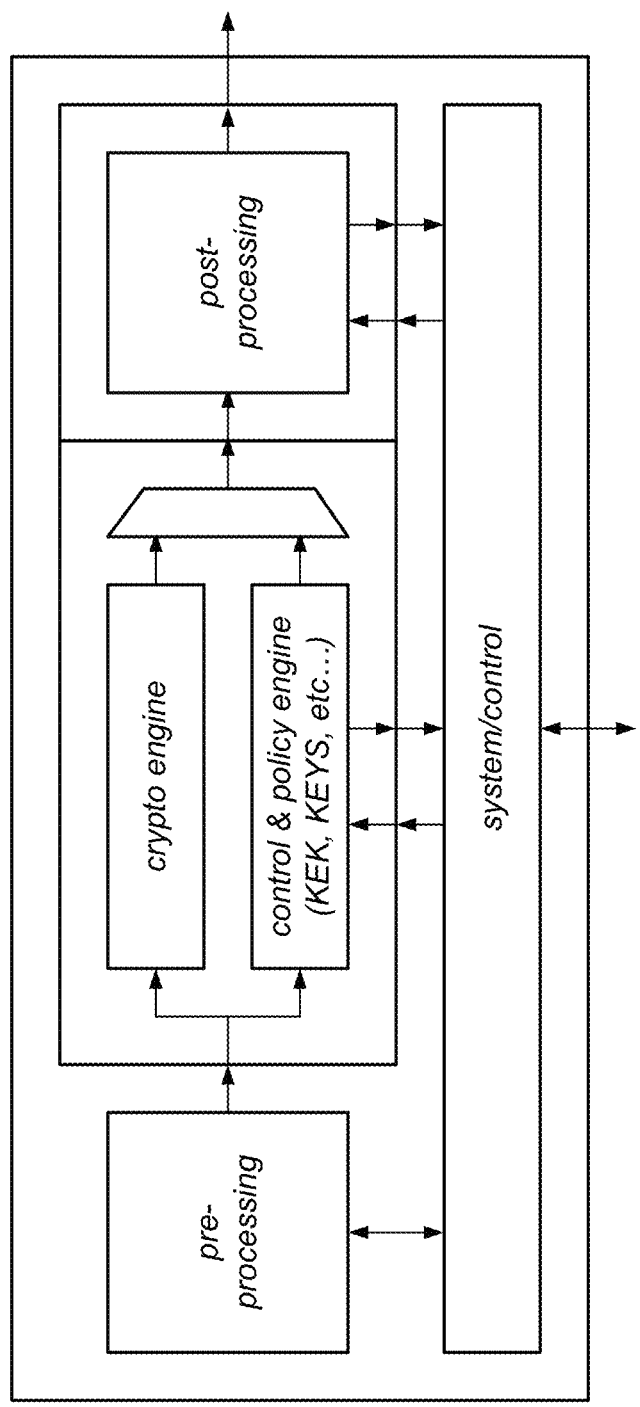
Figure 15:
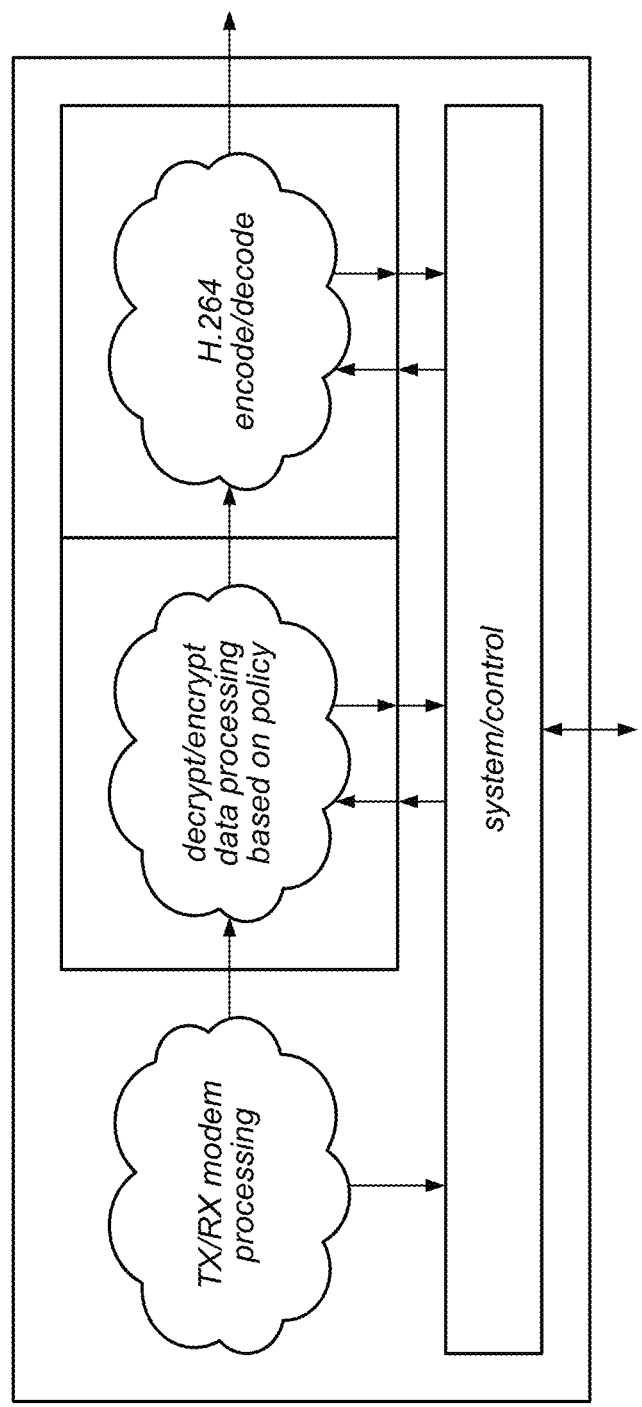
Figure 16:
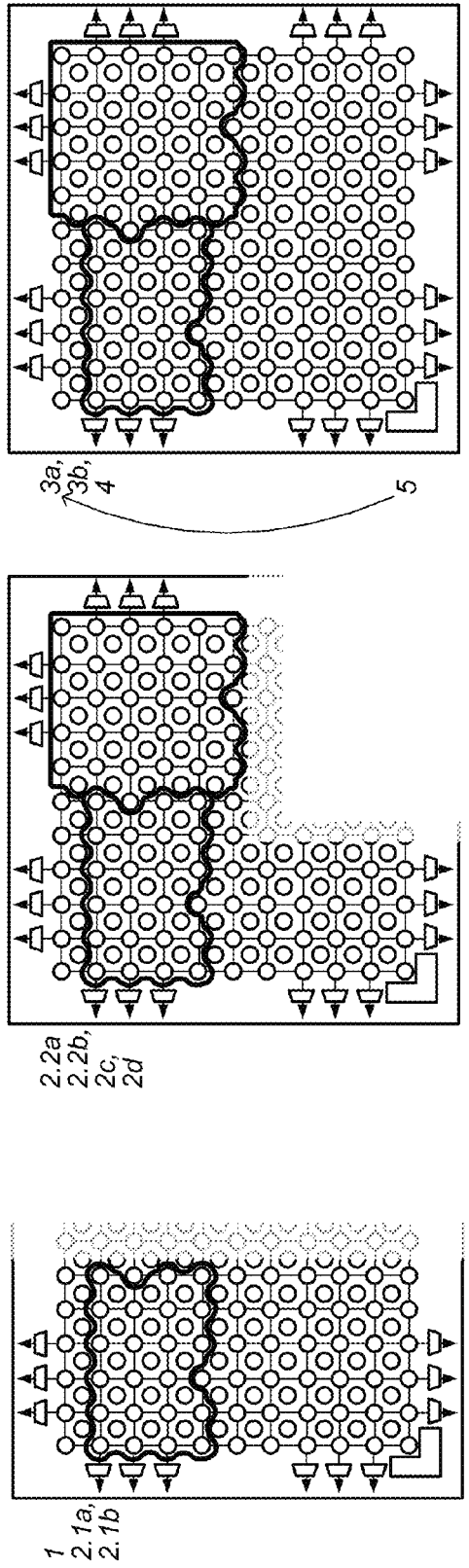

FIGS. 14 and 15 are exemplary block diagrams showing system and logical blocks of the system.

FIG. 17 illustrates an example system application in operation.

Conclusion

The information Security solution described herein may be entirely software based, providing complete control and customization of 1. Availability (of systems and data for intended use only)
2. Integrity (of system and data)
3. Confidentiality (of data and system information)
4. Accountability (to the individual level)
5. Assurance (that the other four objectives have been adequately met)

to the designer/developer. Based on this, the security level of HyperX processor chips and associated systems can be enhanced far above the FIPS levels.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for disabling communication in a multiprocessor fabric, the method comprising:
receiving a configuration for the multiprocessor fabric, wherein the multiprocessor fabric comprises a plurality of processors and a plurality of communication elements, wherein the configuration specifies disabling of communication paths between one or more of:
one or more processors and one or more communication elements;
one or more processors and one or more other processors; or
one or more communication elements and one or more other communication elements;
automatically configuring, in hardware, the multiprocessor fabric to disable the communication paths specified by the configuration, wherein after said automatically configuring, the disabled communication paths are not restorable via software; and
operating the multiprocessor fabric to execute a software application, wherein the multiprocessor fabric operates according to the configuration.

2. The method of claim 1, said automatically configuring the multiprocessor fabric comprises setting register values corresponding one or more processors and/or one or more communication elements to disable the communication paths specified by the configuration.

3. The method of claim 1, wherein the configuration specifies disabling of memory access of a first portion of the multiprocessor fabric by a second portion of the multiprocessor fabric, wherein during operation, the second portion is unable to access memories comprised in the first portion.

4. The method of claim 1, further comprising:
loading encrypted code into the multiprocessor fabric, wherein the configuration is received from the encrypted code;
receiving a second configuration from the encrypted code; and
performing said automatically configuring based on the second configuration.

5. The method of claim 1, further comprising:
loading authenticated code into the multiprocessor fabric, wherein the configuration is received from the authenticated code;
receiving a second configuration from the authenticated code; and performing said automatically configuring based on the second configuration.

6. The method of claim 1, further comprising:
loading encrypted and authenticated code into the multiprocessor fabric, wherein the configuration is received from the encrypted and authenticated code;
receiving a second configuration from the encrypted and authenticated code; and
performing said automatically configuring based on the second configuration.

7. The method of claim 1, wherein said receiving is performed automatically during a boot process of the multiprocessor fabric.

8. The method of claim 1, wherein the plurality of communication elements comprise dynamically configurable communication elements, each comprising a plurality of communication ports, a first memory, and a routing engine.

9. The method of claim 1, wherein, for each of the processors, a plurality of processor ports are configured for coupling to a first subset of the plurality of communication elements;
wherein, for each of the communication elements, a first subset of communication ports are configured for coupling to a subset of the plurality of processors and a second subset of communication ports are configured for coupling to a second subset of the plurality of communication elements.

10. The method of claim 1, wherein the plurality of processors and the plurality of communication elements are coupled together in an interspersed arrangement.

11. A system, comprising:
a multiprocessor fabric, wherein the multiprocessor fabric comprises a plurality of processors and a plurality of communication elements;
configuration logic, wherein the configuration logic is configured to:
receive a configuration for the multiprocessor fabric, wherein the configuration specifies disabling of communication paths between one or more of:
one or more processors and one or more communication elements;
one or more processors and one or more other processors; or
one or more communication elements and one or more other communication elements; and
automatically configure, in hardware, the multiprocessor fabric to disable the communication paths specified by the configuration, wherein after said automatically configuring, the disabled communication paths are not restorable via software;
wherein, after said configuring, the multiprocessor fabric is configured to execute a software application, wherein the multiprocessor fabric operates according to the configuration.

12. The system of claim 11, said automatically configuring the multiprocessor fabric comprises setting register values corresponding to one or more processors and/or one or more communication elements to disable the communication paths specified by the configuration.

13. The system of claim 11, wherein the configuration specifies disabling of memory access of a first portion of the multiprocessor fabric by a second portion of the multiprocessor fabric, wherein during operation, the second portion is unable to access memories comprised in the first portion.

14. The system of claim 11, wherein the configuration logic is configured to:
load encrypted code into the multiprocessor fabric, wherein the configuration is specified by the encrypted code;
receive a second configuration from the encrypted code; and
perform said automatically configuring based on the second configuration.

15. The system of claim 11, wherein the configuration logic is configured to:
load authenticated code into the multiprocessor fabric, wherein the configuration is specified by the authenticated code;
receive a second configuration from the authenticated code; and
perform said automatically configuring based on the second configuration.

16. The system of claim 11, wherein the configuration logic is configured to:
load encrypted and authenticated code into the multiprocessor fabric, wherein the configuration is specified by the encrypted and authenticated code;
receive a second configuration from the encrypted and authenticated code; and
perform said automatically configuring based on the second configuration.

17. The system of claim 11, wherein the reception of the configuration is performed automatically during a boot process of the multiprocessor fabric.

18. The system of claim 11, wherein each processor comprises at least one arithmetic logic unit, an instruction processing unit, and a plurality of processor ports.

19. The system of claim 11, wherein each communication element comprises a dynamically configurable communication element, each comprising a plurality communication ports, a first memory, and a routing engine.

20. The system of claim 11, wherein, for each of the processors, a plurality of processor ports are configured for coupling to a first subset of the plurality of communication elements; and
wherein, for each of the communication elements, a first subset of communication ports are configured for coupling to a subset of the plurality of processors and a second subset of communication ports are configured for coupling to a second subset of the plurality of communication elements.

* * * * *